(12) United States Patent
Yoon et al.

(10) Patent No.: US 8,862,806 B2
(45) Date of Patent: *Oct. 14, 2014

(54) SEMICONDUCTOR STORAGE DEVICE AND METHOD OF THROTTLING PERFORMANCE OF THE SAME

(75) Inventors: Han Bin Yoon, Hwaseong-si (KR); Yeong-Jae Woo, Guri-si (KR); Dong Gi Lee, Yongin-si (KR); Young Kug Moon, Suwon-si (KR); Hyuck-Sun Kwon, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 376 days.

This patent is subject to a terminal disclaimer.

(21) Appl. No.: 13/166,131

(22) Filed: Jun. 22, 2011

(65) Prior Publication Data

US 2012/0047317 A1 Feb. 23, 2012

(30) Foreign Application Priority Data

Aug. 20, 2010 (KR) .................. 10-2010-0080697
Aug. 20, 2010 (KR) .................. 10-2010-0080698
Aug. 20, 2010 (KR) .................. 10-2010-0080699

(51) Int. Cl.
*G06F 12/00* (2006.01)
*G06F 3/06* (2006.01)

(52) U.S. Cl.
CPC ............ *G06F 3/0679* (2013.01); *G06F 3/0659* (2013.01); *G06F 3/0613* (2013.01)
USPC ........... 711/103; 711/102; 711/114; 711/165; 711/E12.008

(58) Field of Classification Search
USPC .................. 711/102, 103, 114, 165, E12.008
See application file for complete search history.

(56) References Cited

U.S. PATENT DOCUMENTS

| | | | |
|---|---|---|---|
| 7,127,625 B2 * | 10/2006 | Farkas et al. ................. | 713/320 |
| 2003/0212872 A1 * | 11/2003 | Patterson et al. ............ | 711/165 |
| 2008/0126720 A1 | 5/2008 | Danilak | |
| 2008/0126891 A1 | 5/2008 | Danilak | |
| 2008/0228992 A1 | 9/2008 | Dumitru et al. | |
| 2009/0138671 A1 | 5/2009 | Danilak | |

* cited by examiner

*Primary Examiner* — Jasmine Song
(74) *Attorney, Agent, or Firm* — Stanzione & Kim, LLP

(57) ABSTRACT

A semiconductor storage device and a method of throttling performance of the same are provided. The semiconductor storage device includes a non-volatile memory device configured to store data in a non-volatile state, and a controller configured to control the non-volatile memory device. The controller calculates a new performance level, compares the calculated performance level with a predetermined reference, and determines the calculated performance level as an updated performance level according to the comparison result.

36 Claims, 21 Drawing Sheets

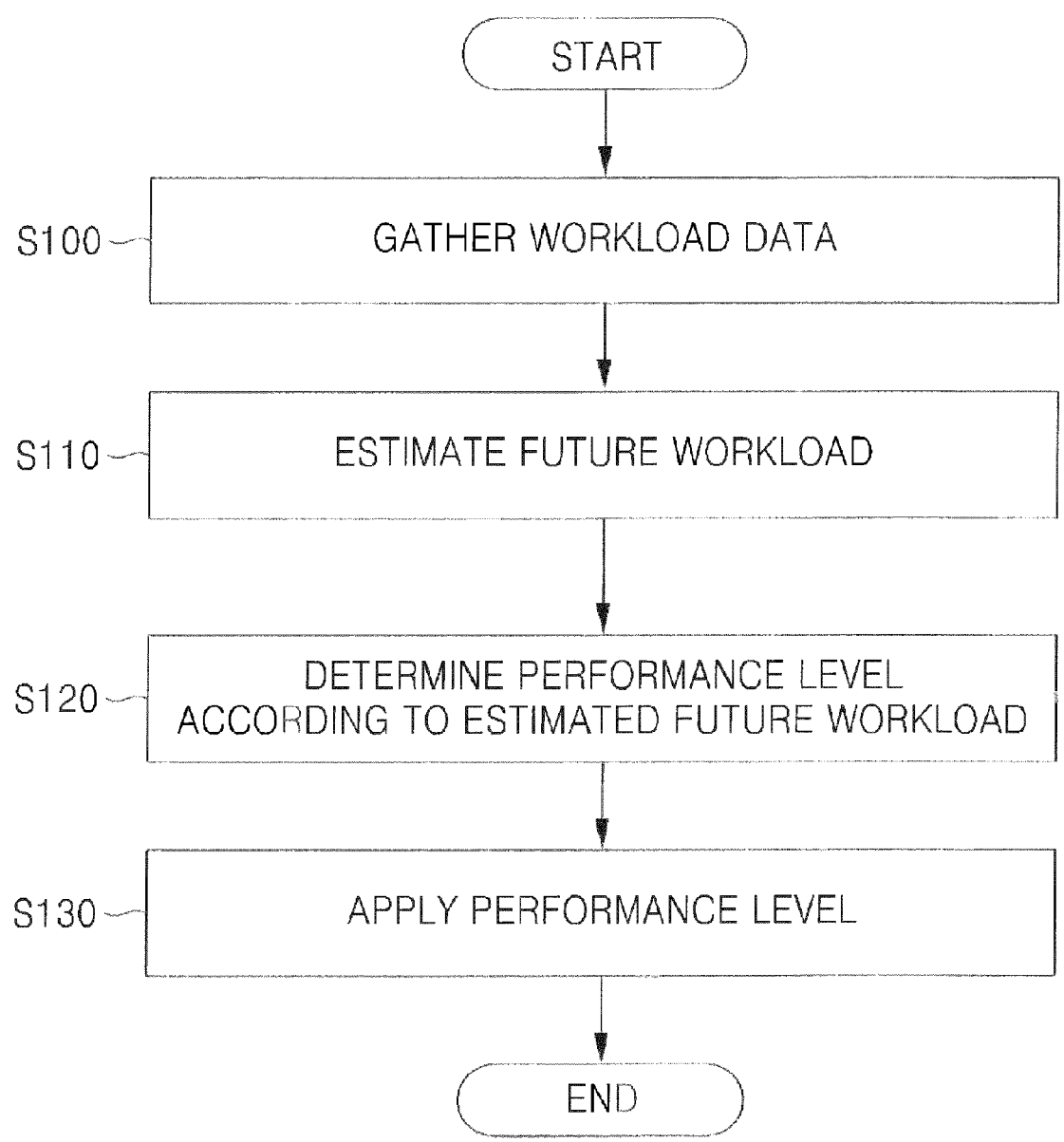

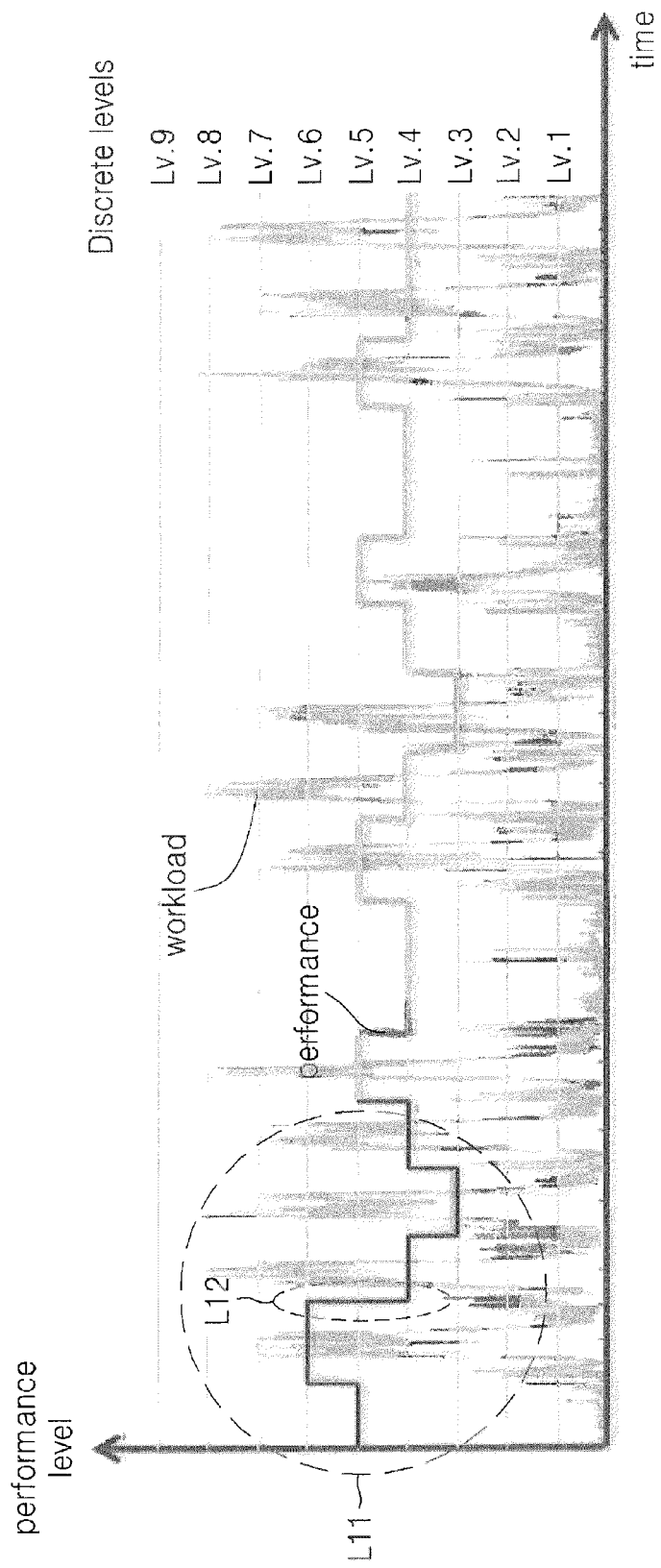

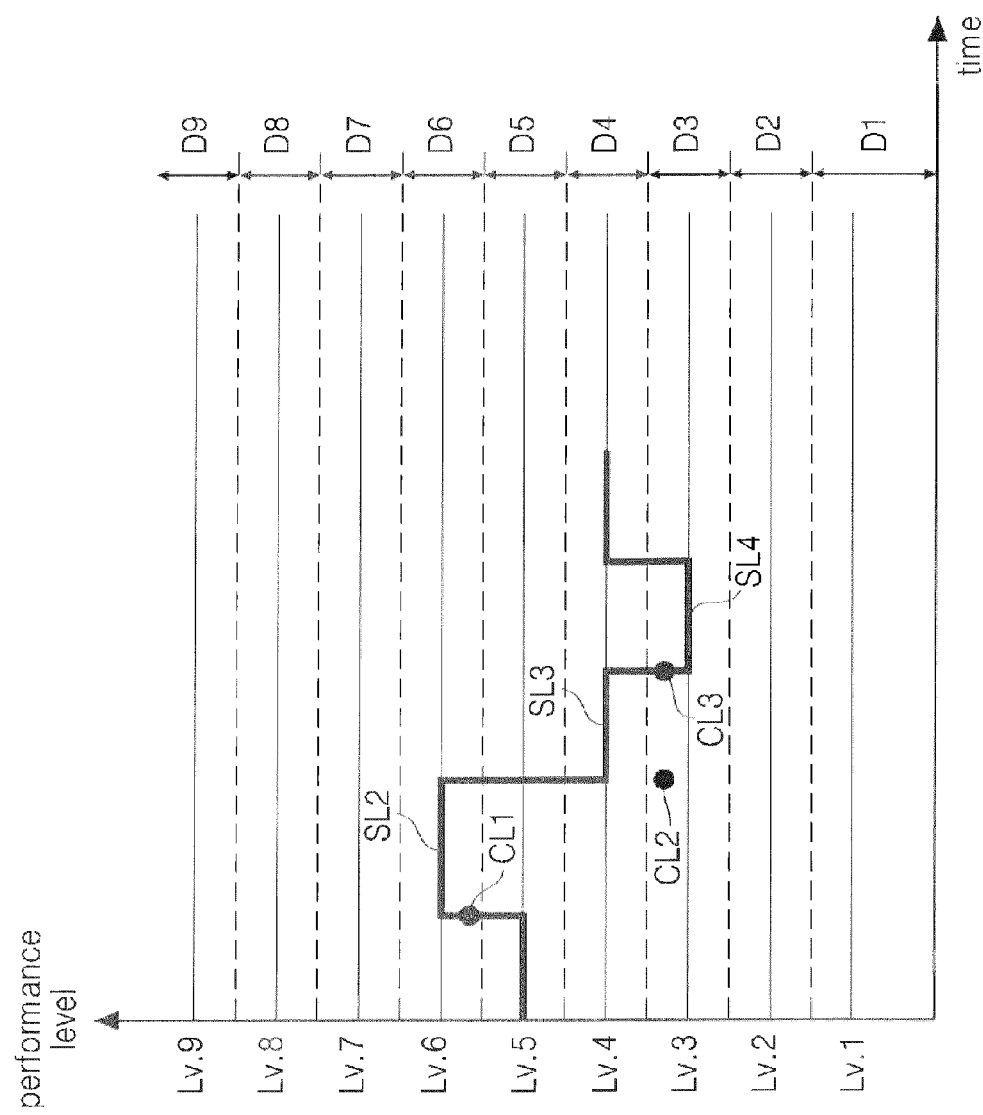

FIG. 13

| Name | Description | |
|---|---|---|
| Feature | N/A | |
| Count | Bit   Description<br>7:1   N/A<br>0     1 for THROTTLING ENABLE, 0 for THROTTLING DISABLE | |
| LBA | N/A | |
| Device | Bit   Description<br>7     Obsolete<br>6     Shall be set to one<br>5     Obsolete<br>4     Transport Dependent<br>3:0  Reserved | |
| Command | 7:0 | FAh |

SEMICONDUCTOR STORAGE DEVICE AND METHOD OF THROTTLING PERFORMANCE OF THE SAME

CROSS-REFERENCE TO RELATED APPLICATIONS

This application claims priority under 35 U.S.C. §119(e) to Korean Patent Application No. 10-2010-0080699 filed on Aug. 20, 2010, in the Korean Intellectual Property Office, the benefit of Korean Patent Application No. 10-2010-0080697 filed on Aug. 20, 2010, in the Korean Intellectual Property Office, and the benefit of Korean Patent Application No. 10-2010-0080698 filed on Aug. 20, 2010, in the Korean Intellectual Property Office, the disclosures of which are incorporated herein by reference in theft entirety.

BACKGROUND

1. Field of the Inventive Concept

The present inventive concept relates to a data storage device, and more particularly, to a semiconductor storage device to store data in non-volatile memory and a method of throttling the performance of the semiconductor storage device.

2. Description of the Related Art

Semiconductor storage devices, which store data using a semiconductor device, especially, a non-volatile memory device, are advantageous in that they are fast, robust to physical shock, generate a small amount of heat or noise, and can be miniaturized compared to disk storage media, i.e., hard disk drives that have been widely used as large-capacity storage devices.

Meanwhile, semiconductor storage devices may have a limited life. For instance, a NAND flash memory device is divided into blocks each of which includes a plurality of pages. When a NAND flash memory device is used, a block is erased and then the pages in the block are sequentially programmed with data. To program with new data in the block in which all pages have been programmed, the block must be erased again. Such procedure is generally referred to as a "program and erase" (PE) cycle. In a NAND flash memory device, the number of PE cycles that a block can endure is limited, which is referred to as the endurance of the NAND flash memory device.

When the number of PE cycles experienced by a block exceeds an endurance limit, the block is more likely to operate in error afterwards. Besides program and erase operations, read operations and spontaneous charge loss may cause memory to operate in error. When the probability of erroneous operation increases, semiconductor storage devices should not be used any more for data integrity. Therefore, semiconductor storage devices using a NAND flash memory device have a limit to the life expectancy.

In the above example, when excessive workloads, for example, write operations, erase operations, and read operations, are put on semiconductor storage devices, the life thereof may be shortened or the expected life may not be ensured. To ensure the expected life of semiconductor storage devices, therefore, it is necessary to throttle the processing performance of semiconductor storage devices according to the intensity or amount of workloads put thereon.

For instance, recently a solid state drive (SSD) has been developed including a multi-level cell (MLC) NAND flash memory for server applications. Such server-bound storage devices require high performance, i.e., high input/output (I/O) per second and have a wide fluctuation of workloads. When MLC NAND flash memory with an endurance limit is used in these applications, it is difficult to guarantee the life of an SSD.

A storage device whose life needs to be guaranteed is not restricted to a server-bound storage device. The lives of storage devices to be used in personal computers (PCs), notebook computers, mobile terminals, and so on also need to be ensured.

In addition to the NAND flash memory, phase-change random access memory (PRAM), magnetic RAM (MRAM), resistive RAM (ReRAM), and ferroelectric RAM (FeRAM) are examples of memory with such endurance limits. NAND flash memory with the an endurance limit includes a NAND flash memory using a floating gate and a NAND flash memory using charge trap flash (CTF).

As described above, an approach to increasing the life of a semiconductor storage device using a non-volatile memory with an endurance limit or ensuring the expected life thereof is desired.

SUMMARY

Some embodiments of the present inventive concept provide a semiconductor storage device and a method to adaptively throttle the performance according to the workload of the semiconductor storage device to ensure or increase the expected life thereof.

Additional aspects and utilities of the present general inventive concept will be set forth in part in the description which follows and, in part, will be obvious from the description, or may be learned by practice of the present general inventive concept.

According to some embodiments of the present inventive concept, there is provided a semiconductor storage device including a non-volatile memory device configured to store data in a non-volatile state, and a controller configured to control the non-volatile memory device.

In embodiments, the controller calculates a new performance level, compares the calculated performance level with a predetermined reference, and determines the calculated performance level as an updated performance level according to the comparison result.

Embodiments of the of the present inventive concept also provide a method of throttling performance of a semiconductor storage device (SSD) including a non-volatile memory device and a controller to control the non-volatile memory device, the method including operating the SSD at a performance level based on a previous workload history of the SSD, estimating a future workload of the SSD in response to commands being received from a host, and applying a new performance level to the SSD corresponding to the estimated future workload based on whether a certain condition exists.

Embodiments of the of the present inventive concept also provide a method of throttling performance of a semiconductor storage device (SSD) including a non-volatile memory device and a controller to control the non-volatile memory device, the method including operating the SSD at a performance level based on a previous workload history thereof, receiving commands from a host, and gathering workload data of the current workload of the SSD based on the commands received from the host.

In embodiments, the method may further include calculating a new performance level to be applied to the SSD based on the gathered workload data, and replacing the current performance level with the calculated new performance level when a certain condition occurs.

In embodiments, the method may further include calculating a new performance level to be applied to the SSD based on the gathered workload data, determining the difference between the calculated new performance level and the previous performance level and a reference difference value, and adjusting the calculated new performance level to be a value different from the previous performance value by the reference difference value when the determined difference between the calculated new performance level and the previous performance level is greater than the reference difference and applying the adjusted performance level, otherwise applying the new calculated performance level.

In embodiments, the method may further include calculating a new performance level based on the gathered workload data and selecting a discrete performance level closest to the new calculated performance level to be applied the SSD when a certain condition occurs.

Embodiments of the of the present inventive concept also provide a controller to gather workload data related to a workload of the SSD based on commands received from a host, to estimate a future workload of the SSD based on the gathered workload data, to calculate a new performance level of the SSD according to the estimated future workload of the SSD, and to change the performance level of the SSD based on certain conditions.

Embodiments of the of the present inventive concept also provide a semiconductor storage device (SSD), including a non-volatile memory device and a controller to receive commands from a host, to control the SSD based on a previous workload history thereof, and to gather workload data of the current workload of the SSD based on the commands received from a host.

In embodiments, the controller may further include a throttling module to calculate a new performance level to be applied to the SSD based on the gathered workload data, to determine the difference between the calculated new performance level and the previous performance level and a reference difference value, to adjust the calculated new performance level to be a value different from the previous performance value by the reference difference value when the determined difference between the calculated new performance level and the previous performance level is greater than the reference difference and apply the adjusted performance level, otherwise apply the new calculated performance level.

In embodiments, the controller may further include a throttling module to calculate a new performance level based on the gathered workload data and to select a discrete performance level closest to the new calculated performance level to be applied to the SSD when a level gap between the selected discrete performance level and the performance level based on the previous workload history is less than or equal to a predetermined reference gap, otherwise selecting a discrete performance level within the predetermined reference gap to be applied to the SSD.

In embodiments, the non-volatile memory device stores a throttling program code, and the controller controls the program code to calculate a new performance level to be applied to the SSD based on the gathered workload data, to determine the difference between the calculated new performance level and the previous performance level and a reference difference value, to adjust the calculated new performance level to be a value different from the previous performance value by the reference difference value when the determined difference between the calculated new performance level and the previous performance level is greater than the reference difference, and to apply the adjusted performance level, otherwise to apply the new calculated performance level.

In embodiments, the non-volatile memory device stores a throttling program code, and the controller controls the program code to calculate a new performance level based on the gathered workload data and to select a discrete performance level closest to the new calculated performance level to be applied to the SSD when a level gap between the selected discrete performance level and the performance level based on the previous workload history is less than or equal to a predetermined reference gap, otherwise to select a discrete performance level within the predetermined reference gap to be applied to the SSD.

BRIEF DESCRIPTION OF THE DRAWINGS

The above and other features and utilities of the present inventive concept will become more apparent by describing in detail exemplary embodiments thereof with reference to the attached drawings in which:

FIG. 5A is a flowchart of a method of operating a semiconductor storage device according to some embodiments of the present inventive concept;

FIG. 12A is a graph showing the change of the performance level of the semiconductor storage device 10 according to the method illustrated in FIG. 11;

FIG. 12B is a graph explaining a method of selecting a discrete level based on a calculated performance level;

FIG. 13 is a table showing the format of a host command according to some embodiments of the present inventive concept;

DETAILED DESCRIPTION OF THE EMBODIMENTS

Figure 1:
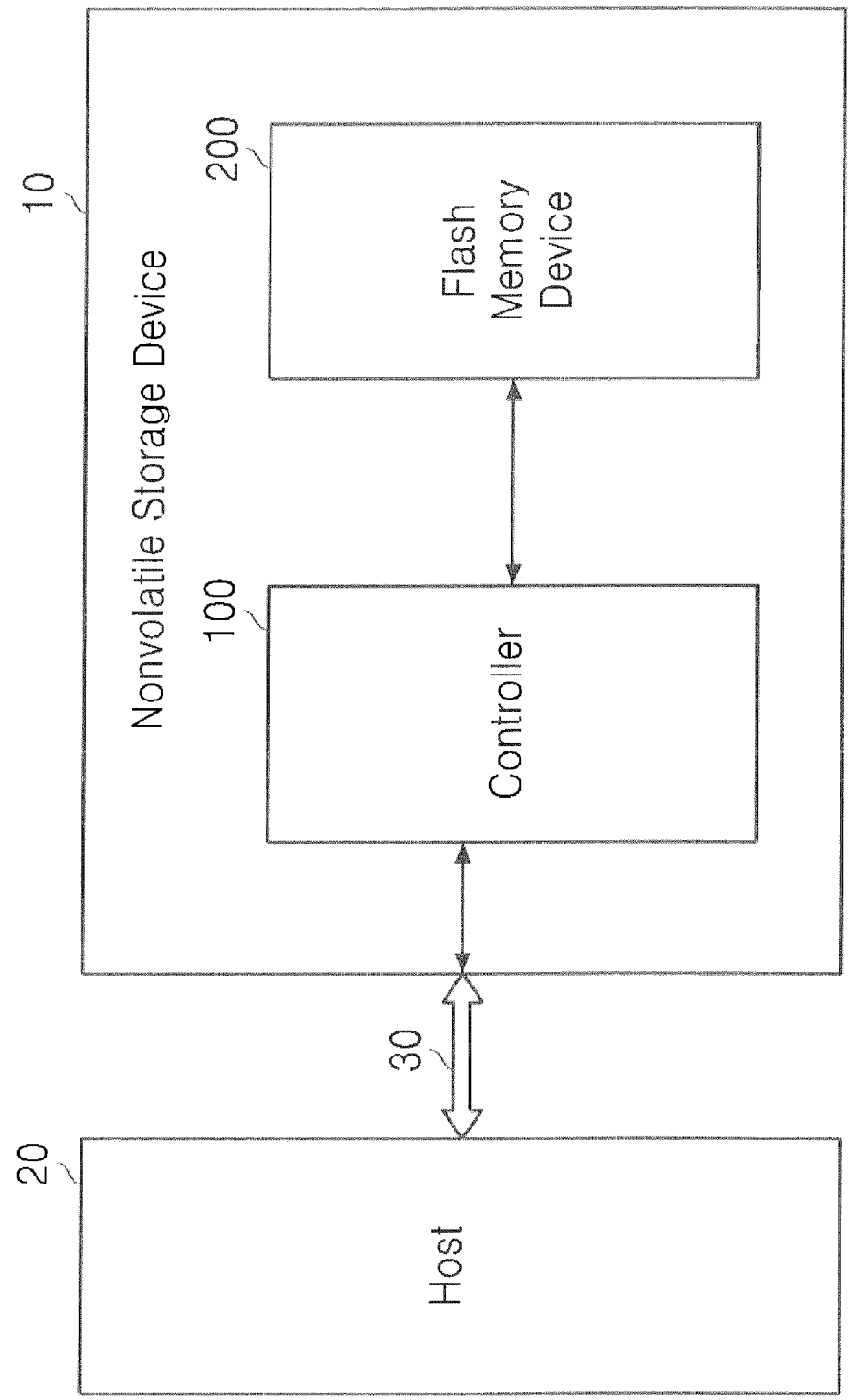
FIG. 1 is a schematic block diagram of a data storage system according to some embodiments of the present inventive concept.

The present inventive concept now will be described more fully hereinafter with reference to the accompanying drawings, in which embodiments of the general inventive concept are shown. This general inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the present inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The present inventive concept relates to a method of gathering and estimating workloads, i.e., the intensity and the pattern of the workloads that a semiconductor storage device will undergo before throttling the performance of the semiconductor storage device. Only after the intensity and the pattern of workloads are obtained, can the performance of the semiconductor storage device with respect to the ensured life and the endurance limit of the semiconductor storage device.

FIG. 1 is a schematic block diagram of a data storage system 1 according to some embodiments of the present inventive concept. The data storage system 1 includes a semiconductor storage device 10 and a host 20. The semiconductor storage device 10 includes a controller 100 and a non-volatile memory device 200, such as, for example, a flash memory device.

The host 20 may communicate with the semiconductor storage device 10 using an interface protocol such as Peripheral Component Interconnect Express (PCI-E), Advanced Technology Attachment (ATA), Serial ATA (SATA), Parallel ATA (PATA), or Serial Attached SCSI (SAS). However, the interface protocol between the host 20 and the semiconductor storage device 10 is not restricted to the above examples, and may be a universal serial bus (USB) protocol, a multi-media card (MMC) protocol, or an integrated drive electronics (IDE) protocol.

The semiconductor storage device 10 may be a solid state drive (SSD) or a secure digital (SD) card, but the present inventive concept is not restricted thereto. The non-volatile memory device 200 may be a flash memory device, but the present inventive concept is not restricted thereto. The non-volatile memory device 200 may be a phase-change random access memory (PRAM) device, a magnetic RAM (MRAM) device, a resistive RAM (ReRAM) device, or a ferroelectric RAM (FeRAM) device. When the non-volatile memory device 200 is a flash memory device, it may be a NAND flash memory device using a floating gate or charge trap flash (CTF). Memory cell transistors included in the non-volatile memory device 200 may be arranged in two dimensions or in three dimensions.

The controller 100 controls the overall operation of the semiconductor storage device 10 and controls all data exchange between the host 20 and the non-volatile memory device 200. For instance, the controller 100 can control the non-volatile memory device 200 to write or read data at the request of the host 20. Also, the controller 100 can control internal operations, such as performance throttling, merging, and wear-leveling, necessary for the characteristics or the efficient management of the non-volatile memory device 200.

The non-volatile memory device 200 is a storage device to store data in a non-volatile state. It may store an operating system (OS), various programs, and diverse data.

Figure 2:
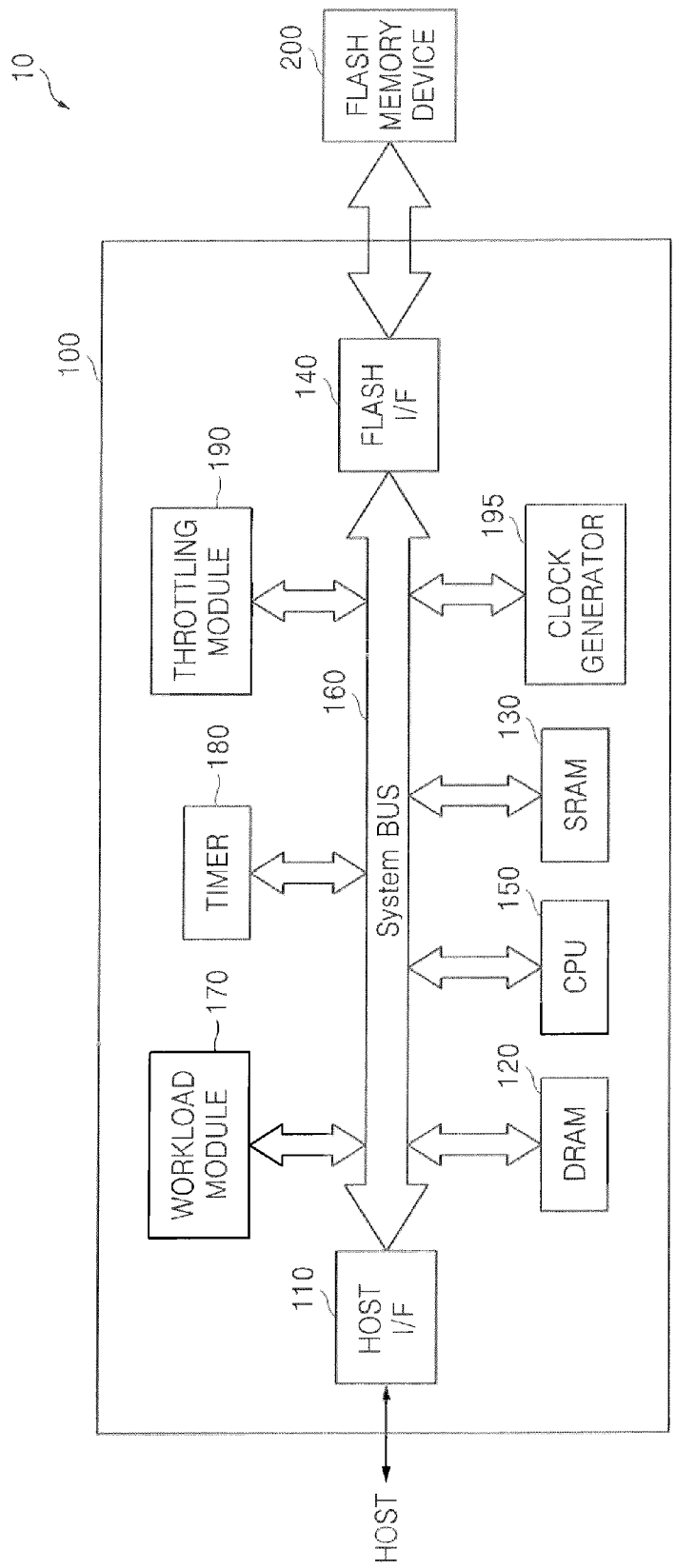
FIG. 2 is a schematic block diagram of a controller according to some embodiments of the present inventive concept.

FIG. 2 is a schematic block diagram of the controller 100 according to some embodiments of the present inventive concept. The controller 100 includes a host interface (I/F) 110, a dynamic RAM (DRAM) 120, a static RAM 130, a memory interface I/F 140, a central processing unit (CPU) 150, a bus 160, a workload module 170, a timer 180, a throttling module 190, and a clock generator 195.

The host interface I/F 110 is equipped with one of the interface protocols described above to communicate with the host 20. The DRAM 120 and the SRAM 130 store data and/or programs in a volatile state. The memory I/F 140 interfaces with the non-volatile memory device 200. The CPU 150 performs an overall control operation to write data to and/or read data from the non-volatile memory device 200. The workload module 170 gathers workload data related to a workload put on the semiconductor storage device 10 and estimates the workload based on the gathered workload data. The throttling module 190 determines a target performance level according to the workload estimated by the workload module 170 and throttles the performance of the semiconductor storage device 10 based on the determined performance level. The timer 180 provides time information to the CPU 150, the workload module 170, and the throttling module 190.

The workload module 170, the timer 180, and the throttling module 190 may be implemented in hardware, software, or combination thereof. When the workload module 170, the timer 180, and the throttling module 190 are implemented in software, a relevant program may be stored in the non-volatile memory device 200, and this program may be loaded to the SRAM 130 and executed by the CPU 150 when the semiconductor storage device 10 is powered on.

The clock generator 195 generates a clock signal necessary for the operation of each of the CPU 150, the DRAM 120, and the non-volatile memory device 200, and provides the respective clock signal(s) to each element. The clock signals respectively provided to the CPU 150, the DRAM 120, and the non-volatile memory device 200 may have different speeds. The clock generator 195 may control the speed of a clock signal applied to each of the CPU 150, the DRAM 120, and the non-volatile memory device 200 according to the performance level determined by the throttling module 190, so that the performance of the semiconductor storage device 10 can be throttled.

Although not shown, the semiconductor storage device 10 may also include other elements such as a read-only memory (ROM), which stores code data executed when the semiconductor storage device 10 is powered on, and an error correction code (ECC) engine, which encodes data to be stored in the non-volatile memory device 200 and decodes data read from the non-volatile memory device 200.

Figure 3:
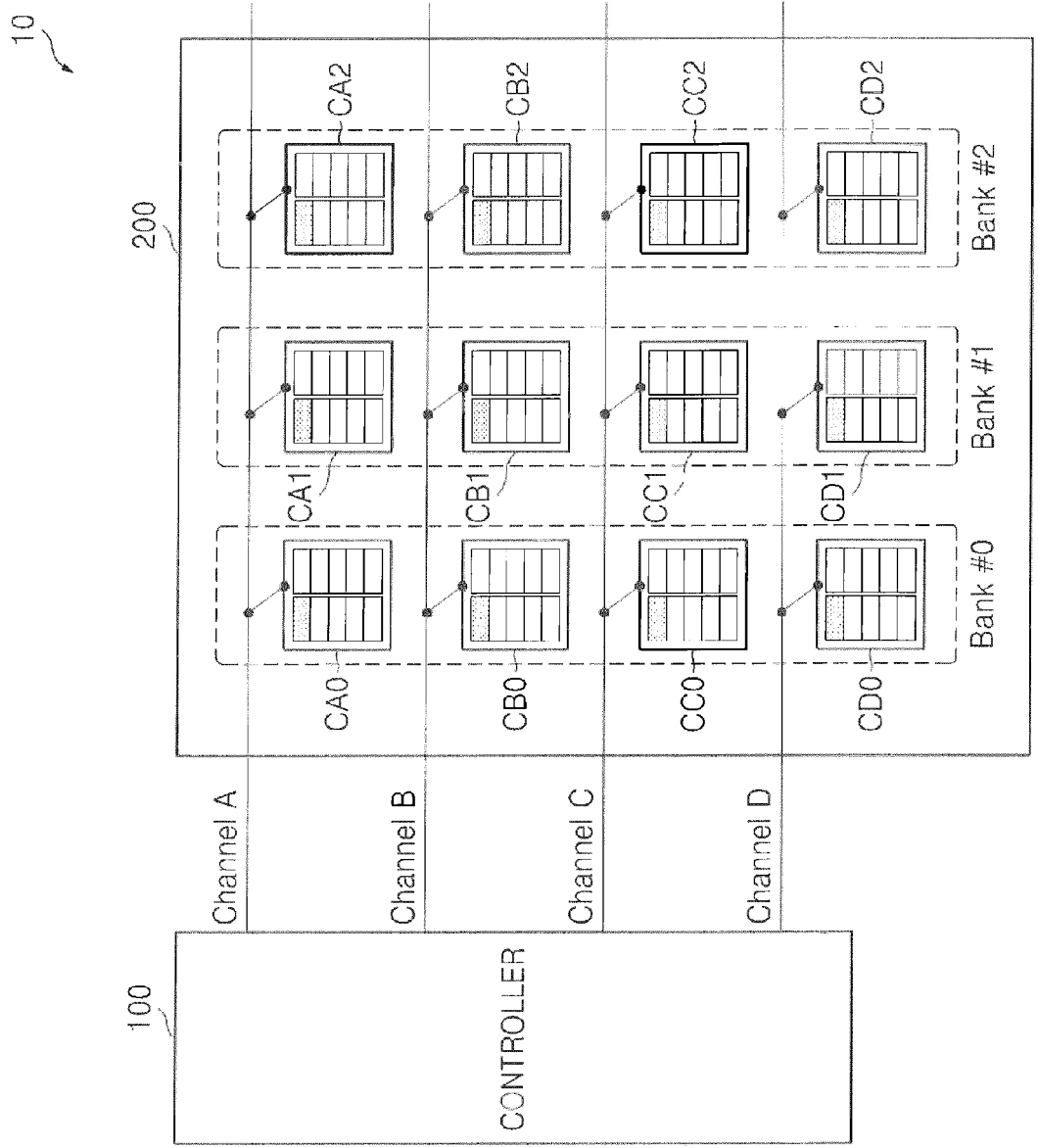
FIG. 3 is a diagram showing the schematic structure of a non-volatile memory device illustrated in FIG. 2.

FIG. 3 is a diagram showing the schematic structure of the non-volatile memory device 200 illustrated in FIG. 2. The non-volatile memory device 200 may include a plurality of memory elements. The non-volatile memory device 200 illustrated in FIG. 3 has the hardware structure of 4 channels and 3 banks, but the present inventive concept is not restricted thereto.

In the semiconductor storage device 10 illustrated in FIG. 3, the controller 100 is connected with the non-volatile memory device 200 through four channels A, B, C, and D each of which is connected to three flash memory elements CA0 through CA2, CB0 through CB2, CC0 through CC2, or CD0 through CD2, respectively. It is apparent that the numbers of channels and banks are not restricted to the current embodiments, and therefore may be changed in accordance with the required electronics, structural design, etc. In such a structure, the performance of the semiconductor storage device 10 may be throttled by the entire non-volatile memory device 200, by buses or channels shared by memory elements or chips, by banks, or by individual memory elements. Here, a bank is a group of memory elements positioned at the same offset on different channels.

Figure 4:
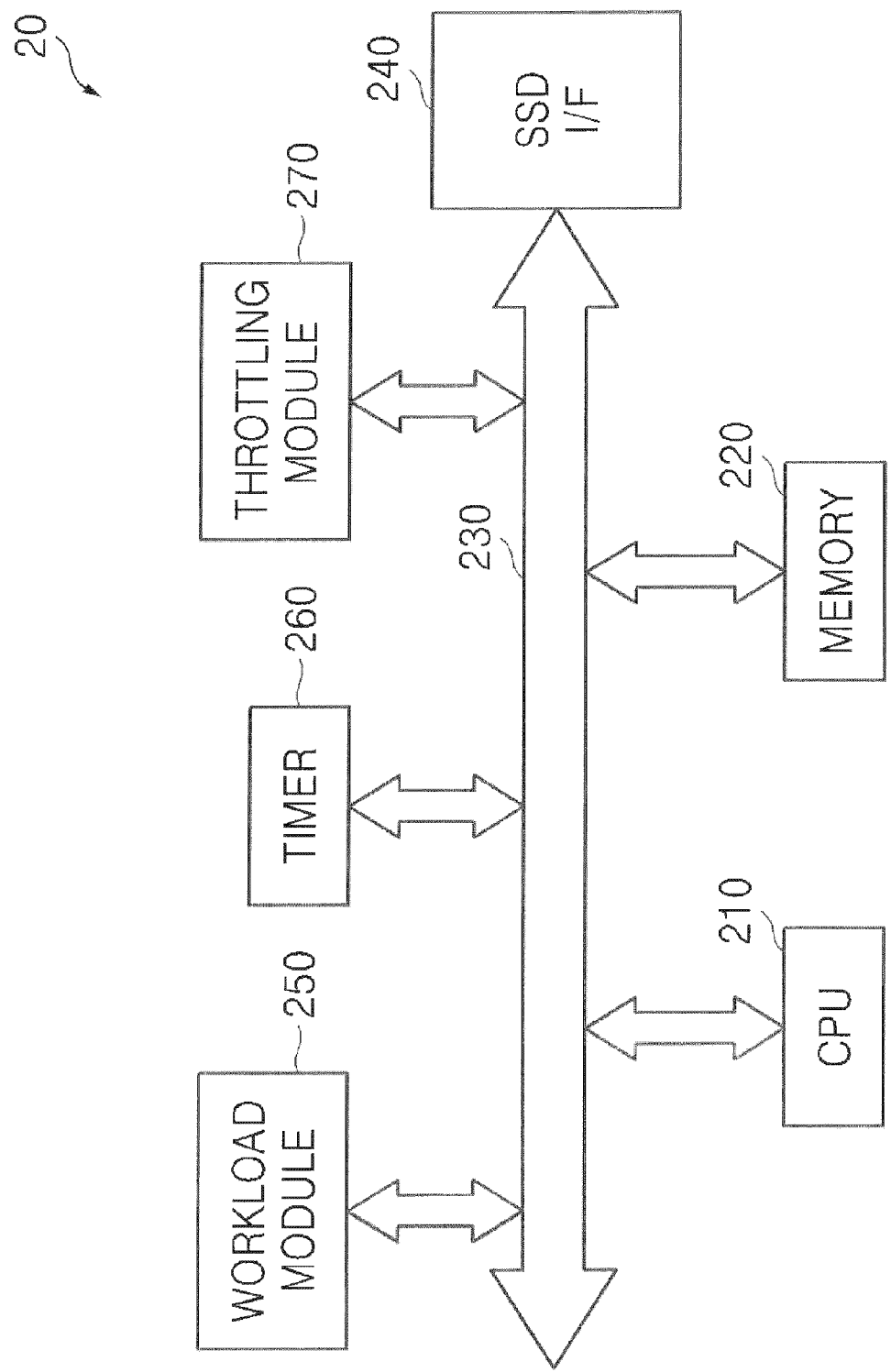
FIG. 4 is a schematic block diagram of a host according to some embodiments of the present inventive concept.

FIG. 4 is a schematic block diagram of the host 20 according to some embodiments of the present inventive concept. The host 20 includes a CPU 210, a memory 220, a bus 230, a storage device I/F 240, a workload module 250, a timer 260, and a throttling module 270.

The storage device interface I/F 240 is equipped with an interface protocol to communicate with the semiconductor storage device 10. The CPU 210 performs an overall control operation to write data to and/or read data from the semiconductor storage device 10. The workload module 250 gathers workload data related to a workload put on the semiconductor storage device 10 and estimates a future workload based on the gathered workload data. The throttling module 270 determines a target performance level according to the future workload estimated by the workload module 250 and throttles the performance of the semiconductor storage device 10 based on the determined target performance level. The timer 260 provides time information to the CPU 210, the workload module 250, and the throttling module 270.

The workload module 250, the timer 260, and the throttling module 270 may be implemented in hardware, software, or combination thereof. The workload module 250 and the throttling module 270 are provided so that the host 20 can throttle or control the performance of the semiconductor storage device 10. When the semiconductor storage device 10 throttles the performance by itself without intervention of the host 20, the host 20 may not include the workload module 250 and the throttling module 270.

Figure 17:
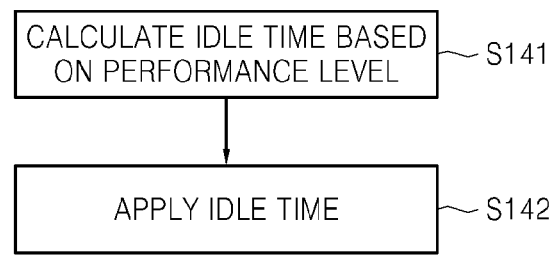
FIG. 17 is a flowchart of applying a performance level according to some embodiments of the present inventive concept.

FIG. 17 is a flowchart of applying a performance level according to some embodiments of the present inventive concept. Referring to FIG. 17, idle time(s) to be inserted between one or more operations of the semiconductor storage device 10 is calculated based on the performance level in operation S141. For example, the idle time calculated can be based on a delay in receiving data from the host 20. Alternatively, for example, the idle time to be inserted between one or more operations of the semiconductor storage device 10 can be determined based on an amount of workload. For example, if the workload of the SSD device is determined to be low at operation 100, then the idle time can be calculated to be lower in order to increase performance thereof. The idle time is applied in operation S142, as illustrated in FIG. 17.

As described above, the performance of the semiconductor storage device 10 may be throttled by inserting the idle time between one or more operations of the semiconductor storage device 10. The idle time may be inserted using the timer 180 or may be inserted by performing a meaningless operation (e.g., a NOP). The timer 180 may be implemented in hardware or software.

To effectively and decisively throttle the performance of the semiconductor storage device 10, the idle time may be designed to occur in addition to each unit operation of the semiconductor storage device 10. For instance, at each of a program operation to the non-volatile memory device 200, a read operation from the non-volatile memory device 200, a read/write operation from/to an internal buffer (e.g., a page buffer) of the non-volatile memory device 200, a read/write operation from/to a buffer (e.g., the DRAM 120 or the SRAM 130) of the controller 100, and a read/write operation from/to the host I/F 110, generation of a predetermined idle time or idle time proportional to the amount of data processed may be enabled.

FIG. 5A is a flowchart of a method of operating the semiconductor storage device 10 according to some embodiments of the present inventive concept. The method may be implemented in the semiconductor storage device 10 or the host 20, or implemented in a distributive manner in both the semiconductor storage device 10 and the host 20. In the embodiments of the present inventive concept, the method is implemented in the semiconductor storage device 10, but the present inventive concept is not restricted to these embodiments.

Referring to FIG. 5A, the controller 100 gathers workload data related to a workload put on the semiconductor storage device 10 in operation S100 while the semiconductor storage device 10 is operating, and estimates a future workload of the semiconductor storage device 10 in operation S110 based on the gathered workload data. The controller 100 also determines a target performance level according to the estimated future workload in operation S120 and can apply the determined target performance level to the operations of the semiconductor storage device 10 in operation S130.

The embodiments of the present inventive concept will present different schemes of determining a performance level in operation S120 in the method of throttling performance illustrated in FIG. 5A.

Figure 5B:
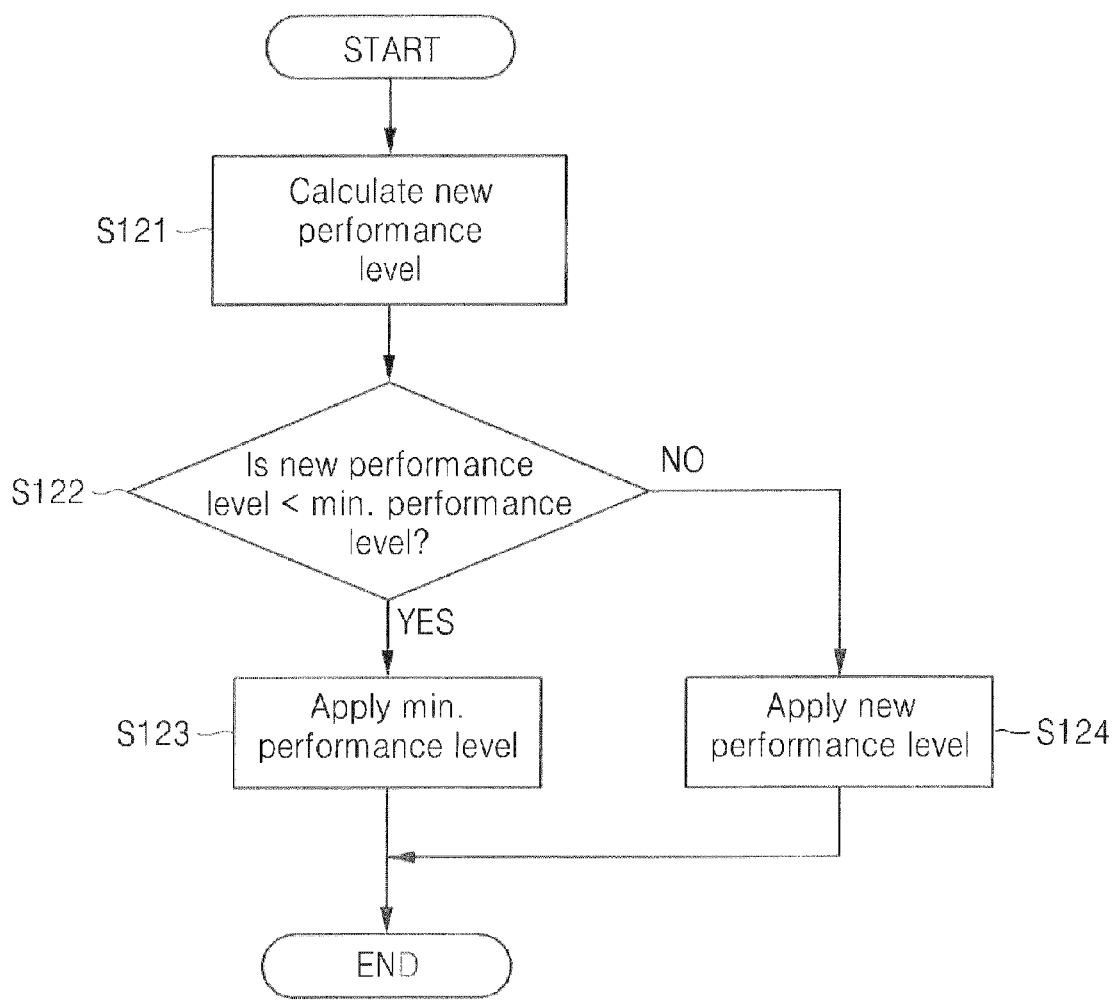
FIG. 5B is a flowchart of a method of throttling performance of the semiconductor storage device 10 according to some embodiments of the present inventive concept.
Figure 6:
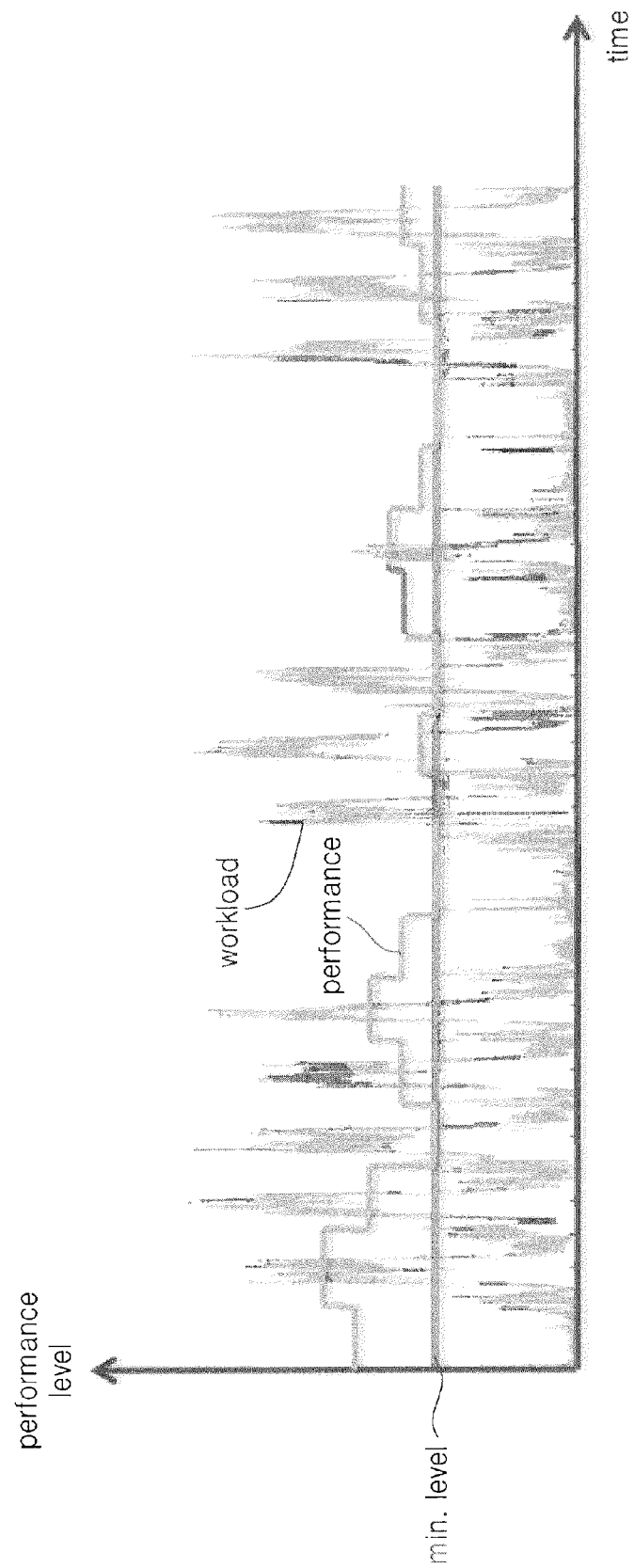
FIG. 6 is a graph showing the change of a performance level of the semiconductor storage device 10 according to the method illustrated in FIG. 5B.

FIG. 5B is a flowchart of a method of throttling performance of the semiconductor storage device 10 according to some embodiments of the present inventive concept. FIG. 6 is a graph showing the change of a performance level of the semiconductor storage device 10 according to the method illustrated in FIG. 5B.

Referring to FIG. 5B, the controller 100 calculates a new performance level in operation S121. At this time, the new performance level may be calculated using a workload estimate, but the present inventive concept is not restricted thereto. Thereafter, the new performance level, i.e., the calculated performance level, is compared with a predetermined reference in operation S122. In this exemplary embodiment, the predetermined reference is a minimum performance level. Accordingly, to determine whether the new performance level is less than the minimum performance level, the new performance level is compared with the minimum performance level in operation S122. When it is determined that the new performance level is less than the minimum performance level, the minimum performance level is selected and applied in operation S123. When the new performance level is greater than or equal to the minimum performance level, the new performance level is selected and applied in operation S124. Operations S121 through S124 illustrated in FIG. 5B may correspond to operations S120 and S130 illustrated in FIG. 5A.

Referring to FIG. 6, when the method illustrated in FIG. 5B is used, the performance level is adjusted according to the change of a workload and is maintained at or above the minimum performance level as well.

As described above, according to some embodiments of the present inventive concept, when the newly calculated performance level is greater than or equal to the minimum performance level, the calculated performance level is determined and applied as a new performance level, but when the newly calculated performance level is less than the minimum performance level, the minimum performance level is selected as a new performance level, so that the performance level is prevented from decreasing below the minimum performance level. Accordingly, even under the worst condition of a maximum workload, the minimum performance of the semiconductor storage device 10 is secured.

Figure 5C:
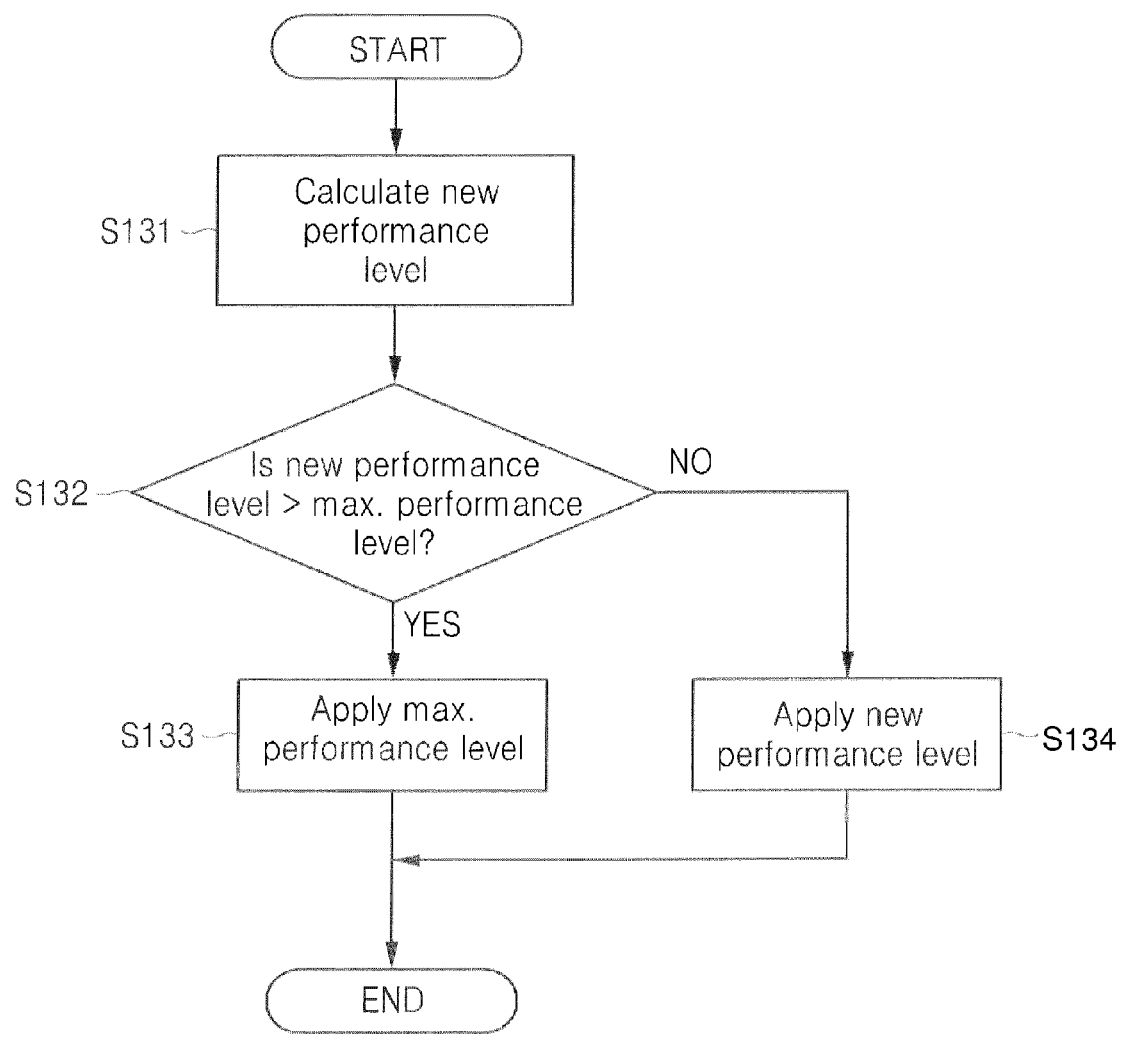
FIG. 5C is a flowchart of a method of throttling performance of the semiconductor storage device 10 according to additional embodiments of the present inventive concept.

FIG. 5C is a flowchart of a method of throttling performance of the semiconductor storage device 10 according to other embodiments of the present inventive concept. Referring to FIG. 5C, the controller 100 calculates a new performance level in operation S131. At this time, the new performance level may be calculated using a workload estimate, but the present inventive concept is not restricted thereto. Thereafter, the new performance level, i.e., the calculated performance level, is compared with a predetermined reference in operation S132. Here, the predetermined reference is a maximum performance level. Accordingly, to determine whether the new performance level is greater than the maximum performance level, the new performance level is compared with the maximum performance level in operation S132. When it is determined that the new performance level is greater than the maximum performance level, the maximum performance level is selected and applied in operation S133. The selected maximum performance level is held during a certain period. When the period ends, the performance level may be newly calculated. The period may be set in response to a period setting command received from the host 20. When the new performance level is less than or equal to the maximum performance level, the calculated performance level is selected and applied in operation S134.

As described above, according to some embodiments of the present inventive concept when the newly calculated performance level is less than or equal to the maximum performance level, the calculated performance level is determined and applied as a new performance level, but when the newly calculated performance level is greater than the maximum performance level, the maximum performance level is selected as a new performance level, so that the performance level is prevented from increasing above the maximum performance level.

Operations S131 through S134 illustrated in FIG. 5C may correspond to operations S120 and S130 illustrated in FIG. 5A.

Figure 7:
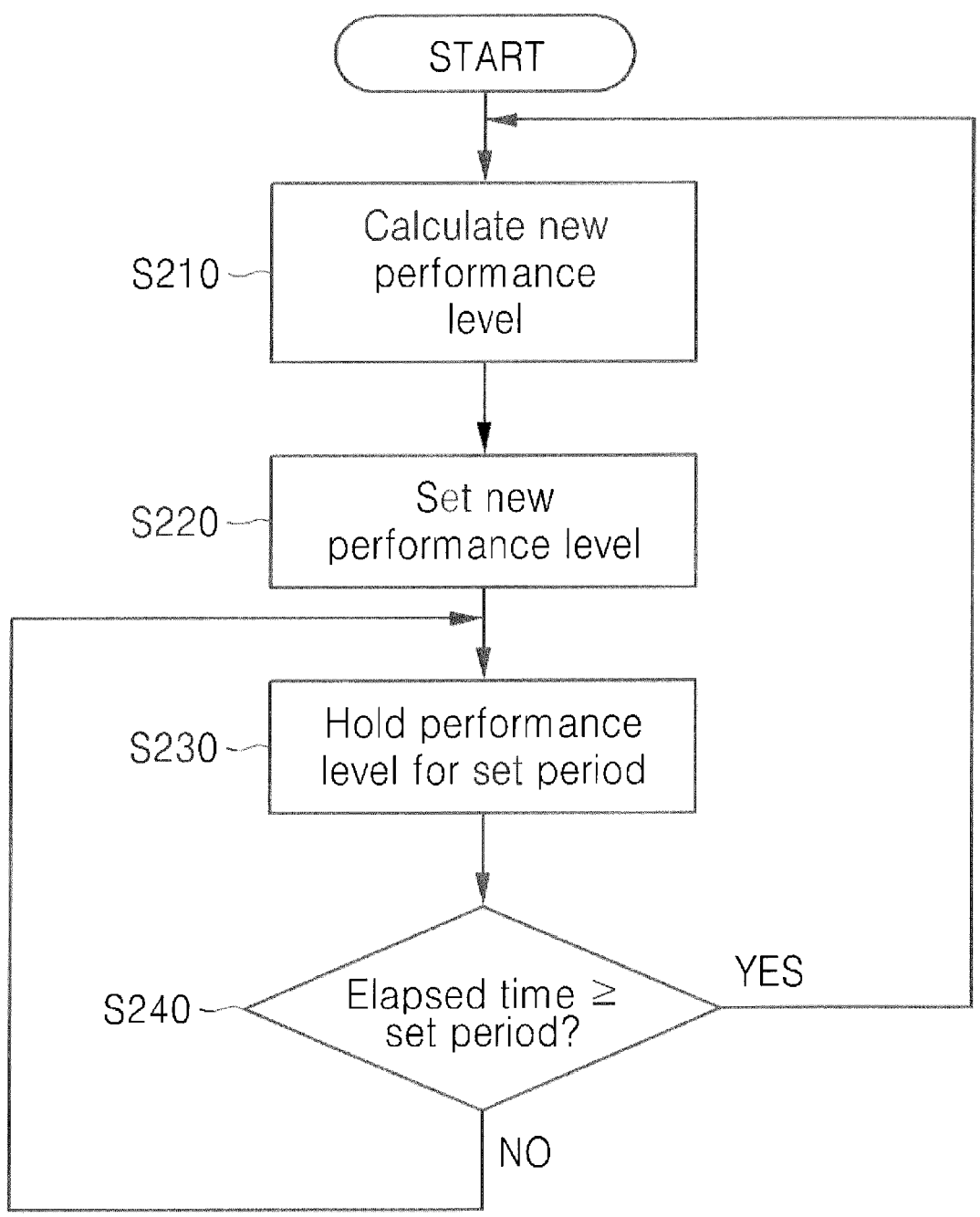
FIG. 7 is a flowchart of a method of throttling performance of the semiconductor storage device 10 according to further embodiments of the present inventive concept.

FIG. 7 is a flowchart of a method of throttling performance of the semiconductor storage device 10 according to further embodiments of the present inventive concept. Referring to FIG. 7, once a new performance level is calculated and set in operation S210 and S220, the performance level is held without being changed during a set period in operation S230.

At this time, it may be determined whether the set period elapses from the moment when the new performance level is applied in operation S240. When it is determined that the set period elapses since application of the new performance level, another new performance level is calculated in operation S210. When it is determined that the set period does not elapse, the performance level is held continuously in operation S230.

Alternatively, a new performance level may be calculated with a predetermined throttling period and applied to the semiconductor storage device 10. In this case, the new performance level may be held during the predetermined throttling period and when the predetermined throttling period ends, the performance level may be newly calculated and applied.

Here, the set period or the predetermined throttling period may be defined in units of hours, days, weeks, or months, but the present inventive concept is not restricted thereto. A performance throttling period may be the same as a performance estimating period, but they may not be the same. For instance, performance estimation may be carried out in units of hours, but performance throttling may be carried out in units of days, or vice versa.

The set period or the throttling period may be set in response to a period setting command from the host 20. The period setting command may have a host command format illustrated in FIG. 13. The format of the period setting command of the host 20 will be described with reference to FIG. 13 later.

The host 20 may set the point and the length of the throttling period using the period setting command when necessary. The set period or the throttling period may be set by a command from the host 20, but may also be set in advance by the semiconductor storage device 10. The performance of the semiconductor storage device 10 is throttled only once per the set period (e.g., 24 hours, 12 hours, or 6 hours) and is maintained constant during a single period. This is to prevent a decrease in the ability of the host 20 to estimate the performance of the semiconductor storage device 10 in a case where the performance of the semiconductor storage device 10 changes too often.

Figure 8:
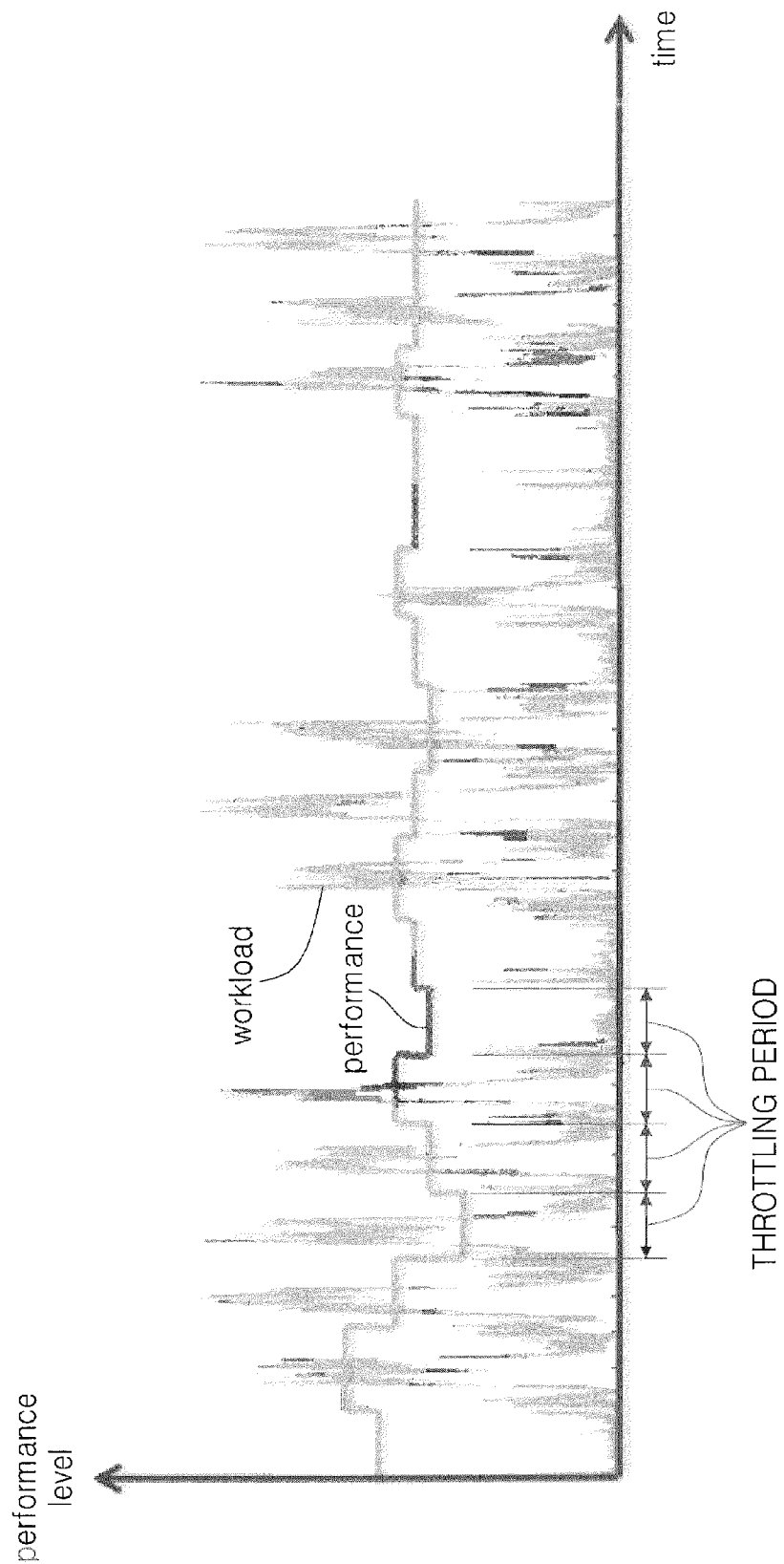
FIG. 8 is a graph showing the change of the performance level of the semiconductor storage device 10 according to the method illustrated in FIG. 7.

FIG. 8 is a graph showing the change of the performance level of the semiconductor storage device 10 according to the method illustrated in FIG. 7. It can be seen from the graph of FIG. 8 that the performance level is adjusted according to the change of the workload at every throttling period.

Figure 9:
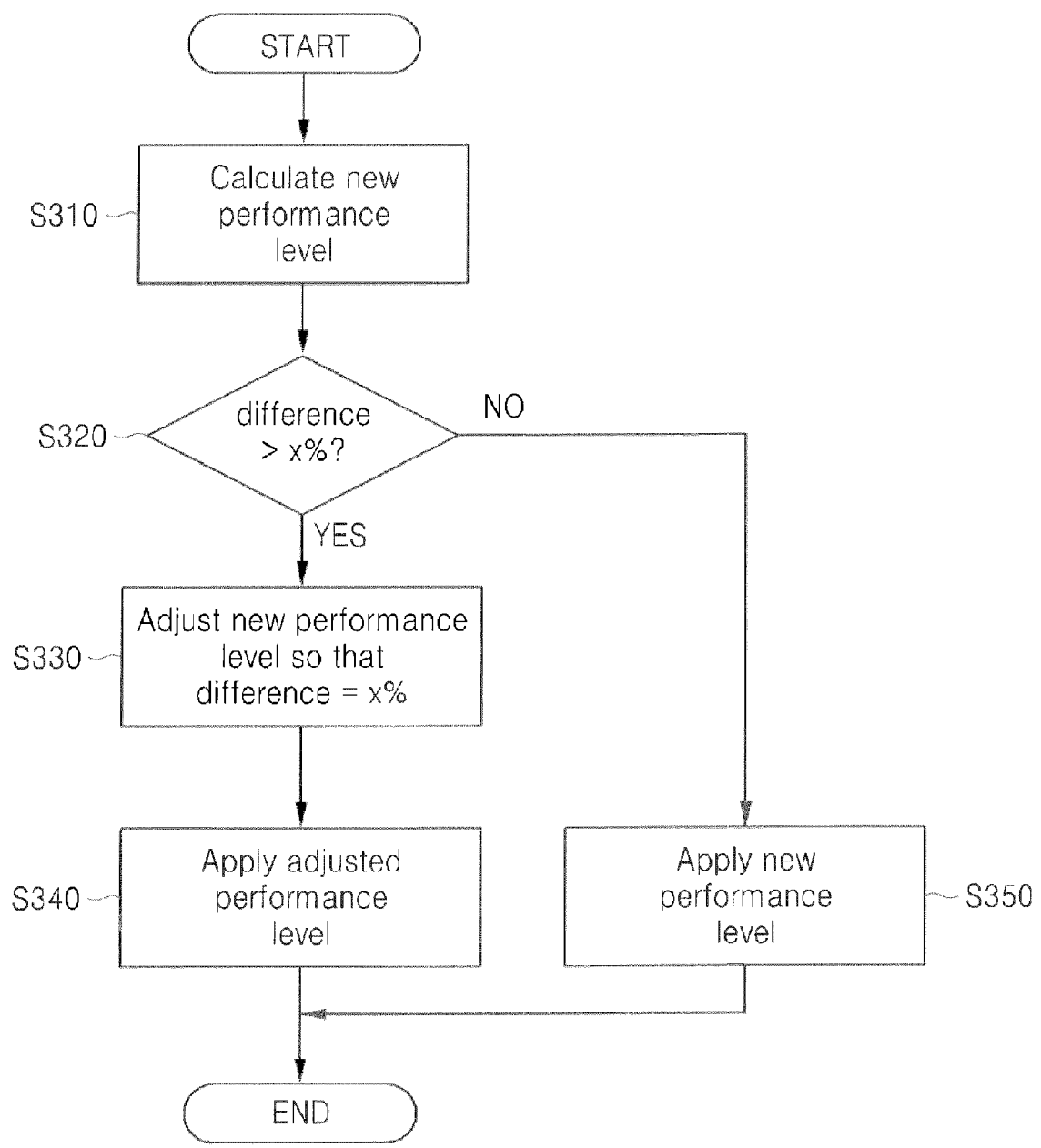
FIG. 9 is a flowchart of a method of throttling performance of the semiconductor storage device 10 according to further embodiments of the present inventive concept.

FIG. 9 is a flowchart of a method of throttling performance of the semiconductor storage device 10 according to further embodiments of the present inventive concept. Referring to FIG. 9, a new performance level is calculated in operation S310. A difference between the calculated performance level and a first performance level is compared with a predetermined reference difference (e.g., x %) in operation S320. The first performance level is a performance level that has been applied previously or is a currently applied performance level.

When the difference between the calculated performance level and the first performance level is less than the reference difference, e.g., x %, the calculated performance level is determined as a new performance level (referred to as a second performance level) and applied in operation S350. The second performance level is a performance level that will be newly applied. So, the first performance level may be referred to as an old performance level or a previous performance level just before updating of the performance level, as compared with the second performance level, which is to be applied based on certain conditions.

When the difference between the calculated performance level and the first performance level is greater than the reference difference, e.g., x %, the calculated performance level is adjusted so that the difference between the calculated performance level and the first performance level is the same as the reference difference, e.g., x %, in operation S330. The adjusted performance level is determined as the second performance level and applied in operation S340.

The reference difference may be set to a certain value or ratio (e.g., x %) in advance. When the reference difference is set to a ratio, e.g., x %, it may be a ratio to the first performance or maximum performance, but the present inventive concept is not restricted thereto.

According to the current embodiments of the present inventive concept, the performance of the semiconductor storage device 10 is throttled so that a difference between an adjusted performance and the first performance (or maximum performance) remains in a reference range ±x % (e.g., "x" is 10, 20, or 5%). This throttling can prevent a decrease in the ability of the host 20 to estimate the performance of the semiconductor storage device 10 in a case where the performance of the semiconductor storage device 10 changes abruptly and considerably.

At this time, when it happens that the difference between the adjusted performance and the first performance (or the maximum performance) is less than ±y % (e.g., "y" is 3, 4, or 2%) at least "n" times (where "n" is 2 or an integer greater than 2) during consecutive throttling periods, the reference difference "x" may be increased. This allows the performance of the semiconductor storage device 10 adapted to regular workloads to effectively respond to an abrupt change of a workload.

In addition, when it happens that a difference between the adjusted performance and the first performance (or the maximum performance) is greater than ±z % (e.g., "z" is 8, 16, or 4%) at least "m" times (where "m" is 2 or an integer greater than 2) during consecutive throttling periods, the reference difference "x" may be decreased. This is to effectively adapt the performance of the semiconductor storage device 10 to changeable workloads.

In contrast, when it happens that the difference between the adjusted performance and the first performance (or the maximum performance) is less than ±y % (e.g., "y" is 3, 4, or 2%) at least "n" times (where "n" is 2 or an integer greater than 2) during consecutive throttling periods, the reference difference "x" may be decreased. When it happens that the difference between the adjusted performance and the first performance (or the maximum performance) is greater than ±z % (e.g., "z" is 8, 16, or 4%) at least "m" times (where "m" is 2 or an integer greater than 2) during consecutive throttling periods, the reference difference "x" may be increased.

Figure 10:
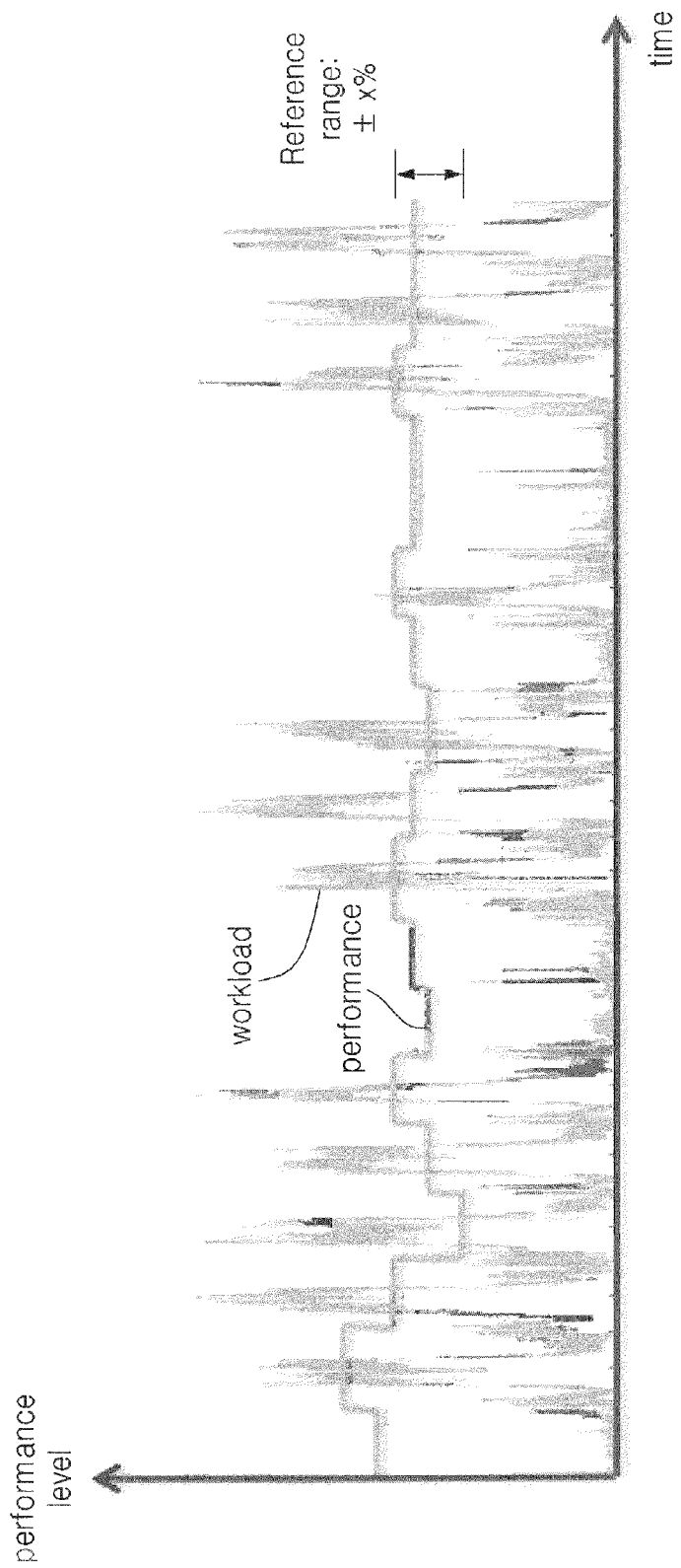
FIG. 10 is a graph showing the change of the performance level of the semiconductor storage device 10 according to the method illustrated in FIG. 9.

FIG. 10 is a graph showing the change of the performance level of the semiconductor storage device 10 according to the method illustrated in FIG. 9. Referring to FIG. 10, the performance level is adjusted according to the change of a workload so that a difference between a new performance level and a previous performance level remains in the reference difference ±x %. Alternatively, as described above, the performance level may be adjusted so that a difference between a new performance level and a maximum performance level remains in the reference difference ±x %.

Figure 11:
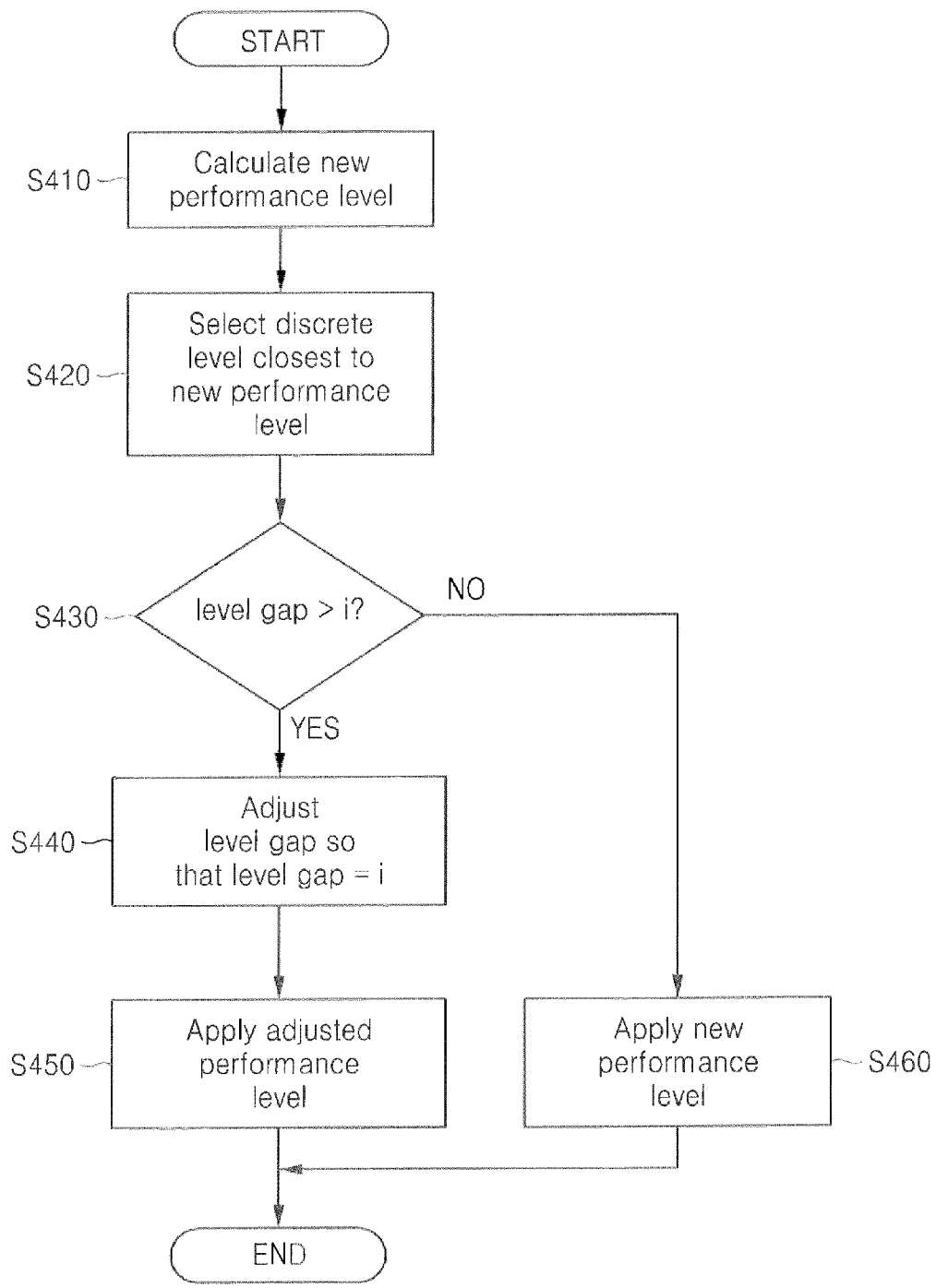
FIG. 11 is a flowchart of a method of throttling performance of the semiconductor storage device 10 according to other embodiments of the present inventive concept.

FIG. 11 is a flowchart of a method of throttling performance of the semiconductor storage device 10 according to other embodiments of the present inventive concept. FIG. 12A is a graph showing the change of the performance level of the semiconductor storage device 10 according to the method illustrated in FIG. 11. FIG. 12B is a graph explaining a method of selecting a discrete level based on a calculated performance level.

Referring to FIGS. 11 through 12B, a new performance level is calculated in operation S410. A discrete level closest to the new performance level is selected from among a plurality of predetermined discrete levels Lv.1 through Lv.9 in operation S420. The plurality of discrete levels Lv.1 through Lv.9 are nine different performance levels in the current embodiments, but the present inventive concept is not restricted to the current embodiments. The number of discrete levels and an interval between adjacent discrete levels may be changed.

Referring to FIG. 12B, when an old performance level, i.e., the first performance level level, is Lv.5 and the calculated new performance level is CL1 and CL1 is closer to Lv.6 than Lv.5, the discrete level Lv.6 closest to the calculated performance level CL1 is selected. In other words, when the calculated performance level CL1 belongs in a section D6, the discrete level Lv.6 is selected. When the calculated performance level is a median value between two adjacent discrete levels, both discrete levels are the closest levels. In this case, either of them may be selected.

A level gap between the selected discrete level and an old performance level (referred to as a first performance level) is calculated and compared with a predetermined reference gap "i" in operation S430. The level gap "i" is a difference between the selected discrete level and the first performance level. For instance, when the first performance level is Lv.4 and the selected discrete level is Lv.3 or Lv.5, the level gap is 1. When the first performance level is Lv.4 and the selected discrete level is Lv.2 or Lv.6, the level gap is 2.

When the level gap is less than or equal to the reference gap "i" (where "i" is 1 or an integer greater than 1), the selected discrete level is determined and applied as a new performance level (referred to as a second performance level) in operation S460. For instance, when the calculated level gap is 1 and the reference gap is 2, the selected discrete level is determined and used as the new performance level, i.e., the second performance level.

When the level gap is greater than the reference gap "i", the level gap is adjusted to be the same as the reference gap "i" in operation S440 and a discrete level corresponding to the adjusted level gap is determined and applied as the second performance level in operation S450. For instance, when the calculated level gap is 3 and the reference gap is 2, the selected discrete level is not determined as the second performance level as it is. Instead, the calculated level gap is adjusted to be the same as the reference gap (e.g., 2) and a discrete level corresponding to the adjusted level gap (e.g., 2) is determined and applied as the second performance level.

Referring back to FIG. 12B, when the old performance level, i.e., the first performance level is Lv.6 and the calculated performance level is CL2, the discrete level Lv.3 closest to the calculated performance level is CL2 is selected in operation S420. Thereafter, the level gap between the selected discrete level Lv.3 and the first performance level Lv.6, i.e., Lv.6−Lv.3=3 is calculated and the level gap "3" is compared with the reference gap, e.g., 2, in operation S430. Since the level gap "3" is greater than the reference gap "2", the level gap is adjusted to be the same as the reference gap in operation S440. The discrete level Lv.4 corresponding to the adjusted level gap "2" is then determined as the second performance level. In other words, the finally selected discrete level is not Lv.3 but Lv.4 as a result of the value of the reference gap "i".

As described above, when the reference gap is "2", the performance level can be changed within a range of only two levels and cannot be changed by over two levels at one time.

In other embodiments of the present inventive concept, when a difference between the second performance level (i.e., a performance level that will be newly applied) and the first performance level (i.e., a performance level that has been applied) is at least two levels, the level shift may not be carried out at one time but may be performed via at least one intermediate level. For instance, when the second performance level is Lv.5 and the first performance level is Lv.2, instead of directly shifting the performance level from Lv.2 to Lv.5, the performance level may be changed to at least one of intermediate levels Lv.3 and Lv.4 between levels Lv.5 and Lv.2 and used, and then may be further changed to the target performance Lv.5 and used. When the level shift is performed via intermediate levels, the performance level may be maintained at each intermediate level for a minimum duration and then shifted to a subsequent level automatically or after a shift or non-shift is determined.

FIG. 13 is a table showing the format of a host command according to some embodiments of the present inventive concept. Referring to FIG. 13, the host 20 may send to the semiconductor storage device 10 a command signal which includes a feature field, a count field, a logic block address (LBA) field, a device field, and a command field in connection with the performance throttling of the semiconductor storage device 10. Each field included in the command may contain a predetermined number of bits. For instance, the command field, the device field, and the count field may have 8 bits.

The period setting command described above may be defined to have a similar format to the host command illustrated in FIG. 13, but the period setting command contains information about a period. The information about the period may be contained in one field among the feature field, the count field, and the LBA field.

The method of throttling performance of the semiconductor storage device 10 according to the various embodiments of the present inventive concept may be implemented in hardware, software, or a combination thereof. When the method is implemented in software, a throttling program code including a plurality of subroutines to execute the method may be stored in the non-volatile memory device 200. At this time, the method of throttling the performance of the semiconductor storage device 10 is performed when the controller 100 executes the throttling program code stored in the non-volatile memory device 200.

The semiconductor storage device 10, according to an exemplary embodiment of the present inventive concept, may be embedded in electronic systems such as mobile devices, laptop computers, or desktop computers. Some examples of the electronic systems are illustrated in FIGS. 14 through 16.

Figure 14:
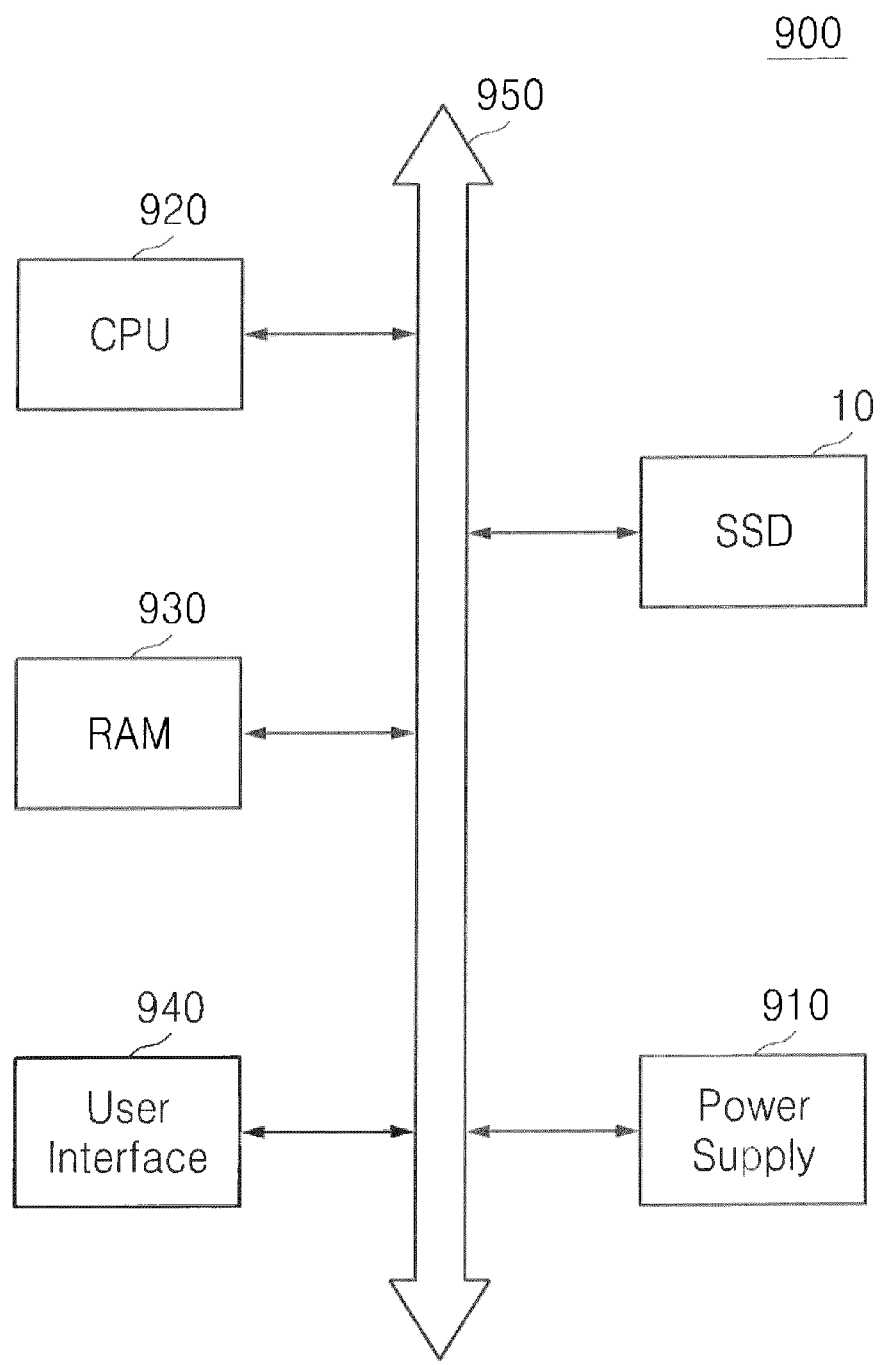
FIG. 14 is a block diagram of an electronic system according to some embodiments of the present inventive concept.

FIG. 14 is a block diagram of an electronic system according to some embodiments of the present inventive concept.

Referring to FIG. 14, the electronic system 900 according to the present exemplary embodiment may include a the semiconductor storage device 10, a power supply 910, a central processing unit (CPU) 920, a RAM 930, a user interface 940, and a system bus 950 electrically connecting these elements.

The CPU 920 controls the overall operation of the electronic system 900. The RAM 930 stores information needed for the operation of the electronic system 900. The user interface 940 provides an interface between the electronic system 900 and a user. The power supply 910 supplies electric power to the internal constituent elements such as the CPU 920, the RAM 930, the user interface 940, and the semiconductor storage device 10.

The CPU 920 may correspond to the host 20, and the semiconductor storage device 10 may store or read data in response to a command from the host 20. The semiconductor storage device 10 according to an exemplary embodiment of the present inventive concept is as described above. A detailed description thereof will be thus omitted.

Figure 15A:
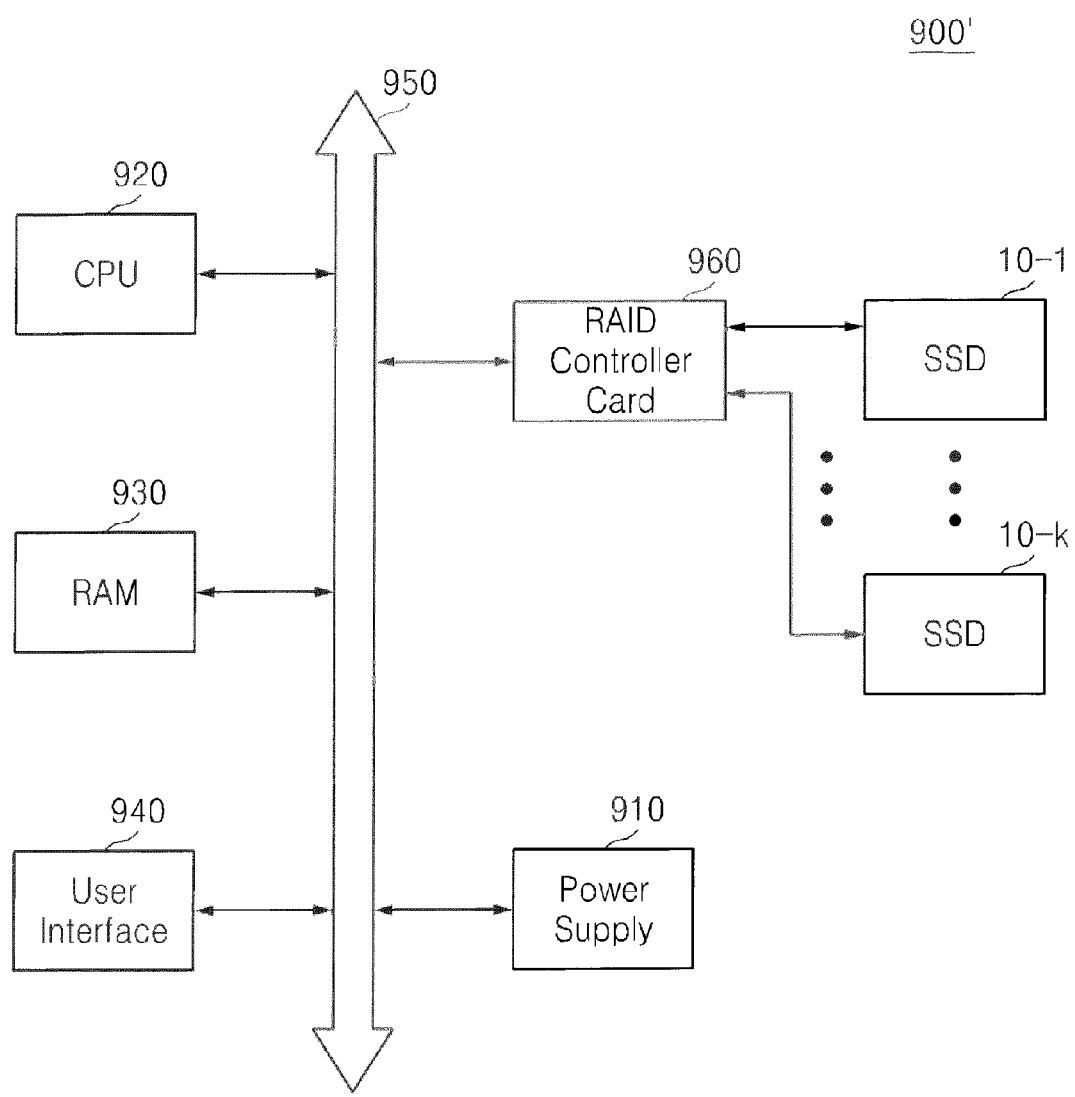
FIGS. 15A and 15B are block diagrams of electronic systems according to some embodiments of the present inventive concept, respectively.
Figure 15B:
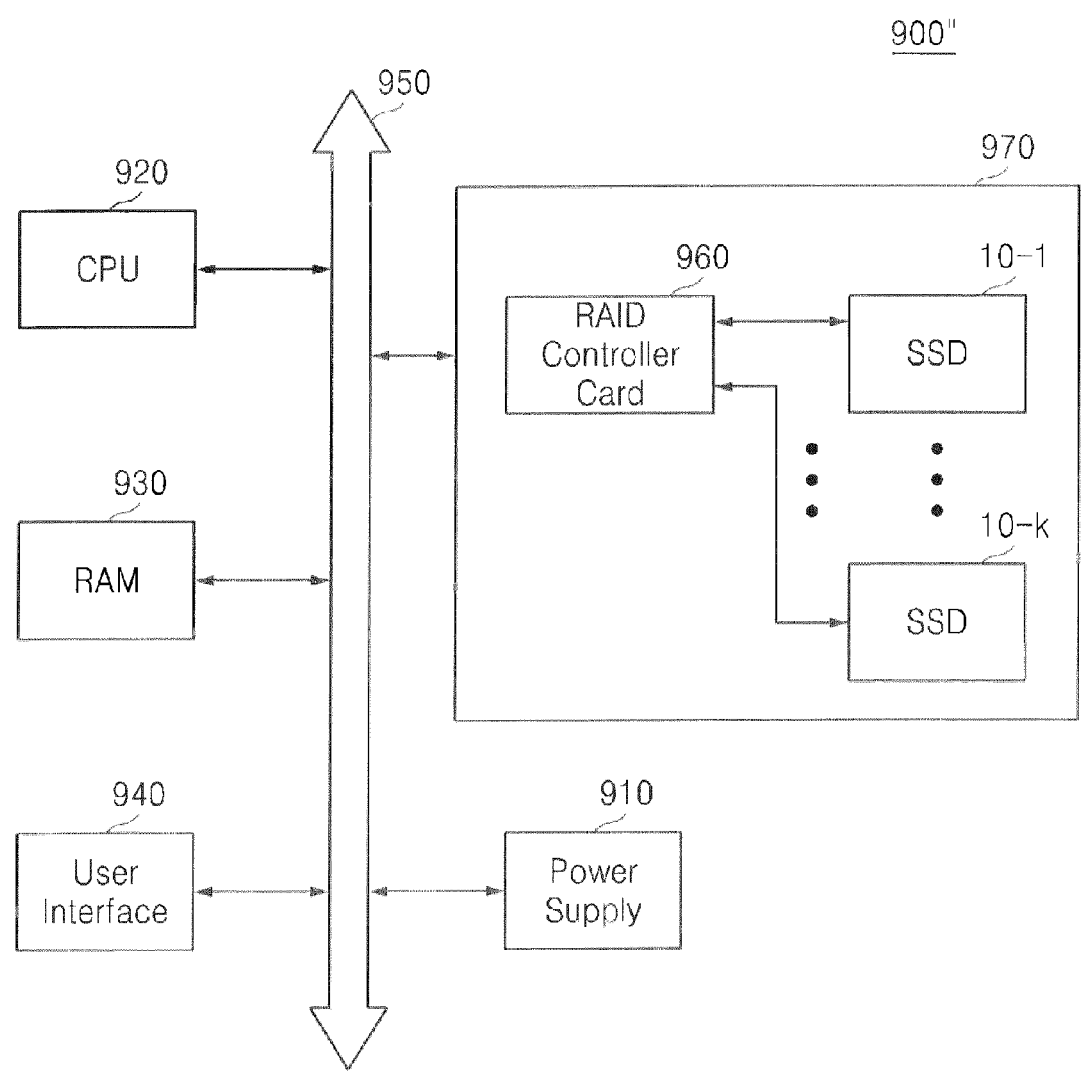
Figure 16:
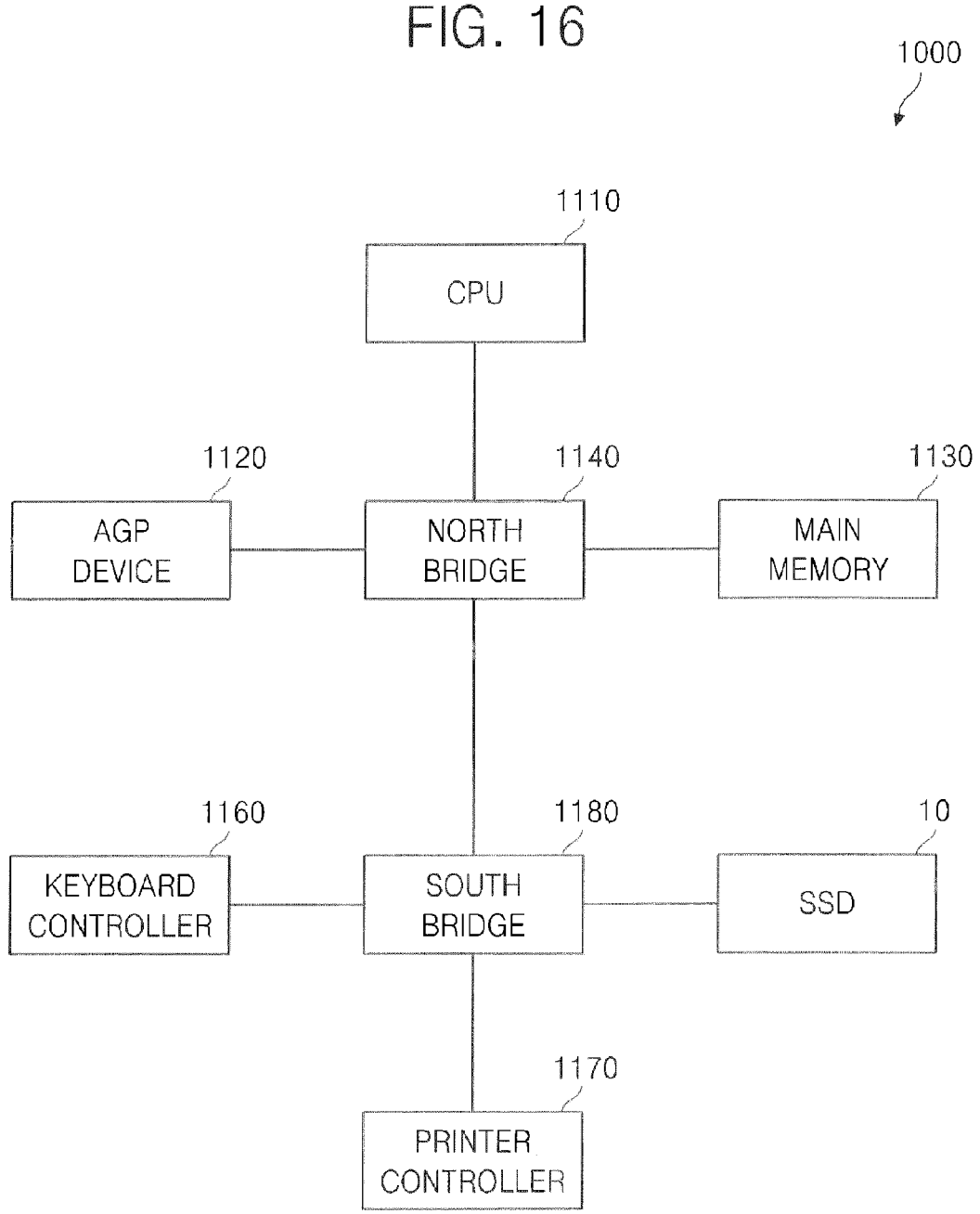
FIG. 16 shows a block diagram of a computer system having the semiconductor storage device of FIG. 1, according to an example embodiment of the present inventive concept.

FIGS. 15A and 15B are block diagrams of electronic systems according to still other exemplary embodiments of the present inventive concept, respectively.

The electronic system as illustrated in FIG. 15A has a similar configuration to the electronic system as illustrated in FIG. 14, so only differences there-between will be described to avoid a repeated description.

The electronic system as illustrated in FIG. 15A further includes a RAID controller card 960 as compared with the electronic system as illustrated in FIG. 14. The RAID controller card 960 is connected between the host 20 and the semiconductor storage device 10 to control the semiconductor storage device 10 in compliance with the host 20. That is, the semiconductor storage device 10 is installed into the RAID controller card 960 and communicates with the host 20 via the RAID controller card 960. In this case, a plurality of semiconductor storage devices 10-1 through 10-*k* may be installed into the RAID controller card 960.

The RAID controller card 960 illustrated in FIG. 15A is implemented as a separate product external of the plurality of semiconductor storage devices 10-1 through 10-*k*.

The electronic system as illustrated in FIG. 15B has a similar configuration to the electronic system as illustrated in FIG. 15A, so only differences there-between will be described to avoid a repeated description. The RAID controller card 960 illustrated in FIG. 15B is implemented as a single product 970 with the plurality of semiconductor storage devices 10-1 through 10-*k*.

FIG. 16 shows a block diagram of a computer system 1000 having a solid state drive (SSD) implemented as the semiconductor storage device 10 of FIG. 1. The computer system 1000 includes a computer CPU (central processing unit) 1110, and includes an AGP (accelerated graphics port) device 1120 and a main memory 1130 coupled to the computer CPU 1110 via a north bridge 1140. The computer system 1000 further includes a keyboard controller 1160, a printer controller 1170, and the SSD 10 coupled to the computer CPU 1110 via a south bridge 1180 and the north bridge 1140. The components 1110, 1120, 1130, 1140, 1160, 1170, and 1180 of the computer system 1000 are generally and individually known to one of ordinary skill in the art. The computer system 1000 may be a PC (personal computer) system or a notebook computer in which the SSD 10 is used as a main storage device instead of a hard disk drive. However, the present inventive concept is not restricted thereto.

As described above, according to embodiments of the present inventive concept, the performance of the semiconductor storage device 10 can be effectively throttled by inserting idle time after at least one of operations of the semiconductor storage device 10 according to an estimated workload.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. A method of throttling performance of a semiconductor storage device (SSD) including a non-volatile memory device and a controller to control the non-volatile memory device, the method comprising:
    operating the SSD at a performance level based on a previous workload history of the SSD;
    estimating a future workload of the SSD in response to commands being received from a host; and
    applying a new performance level to the SSD corresponding to the estimated future workload based on whether a condition exists,
    wherein a change in performance level is achieved by increasing or decreasing an intentionally added delay realized by at least one of controlling a speed of a clock signal applied to an element of the SSD and inserting an idle time between a first operation of the SSD and a second operation of the SSD, each of the first operation and the second operation including one of a read operation and a write operation.

2. The method of claim 1, wherein the new performance level is applied to the SSD under the condition that the new performance level is equal to or greater than a predetermined reference.

3. The method of claim 2, wherein the predetermined reference is a minimum performance level.

4. The method of claim 3, wherein when the new performance level is less than the minimum performance level, the minimum performance level is applied as the new performance level.

5. The method of claim 1, wherein the new performance level is applied to the SSD under the condition that the new performance level is less than or equal to a predetermined reference.

6. The method of claim 5, wherein the predetermined reference is a maximum performance level.

7. The method of claim 6, wherein when the new performance level is greater than the maximum performance level, the maximum performance level is applied as the new performance level.

8. The method of claim 1, wherein the commands being received from the host are gathered as workload data such that the estimated future workload is determined by the workload data.

9. The method of claim 8, wherein the new performance level is calculated using the estimated future workload.

10. A method of throttling performance of a semiconductor storage device (SSD) including a non-volatile memory device and a controller to control the non-volatile memory device, the method comprising:
    operating the SSD at a performance level based on a previous workload history thereof;
    receiving commands from a host; and
    gathering workload data of a current workload of the SSD based on the commands in anticipation of calculating a new performance level,
    wherein a change in performance level is achieved by increasing or decreasing an intentionally added delay realized by at least one of controlling a speed of a clock signal applied to an element of the SSD and inserting an idle time between a first operation of the SSD and a second operation of the SSD, each of the first operation and the second operation including one of a read operation and a write operation.

11. The method of claim 10, further comprising:
    calculating a new performance level to be applied to the SSD based on the gathered workload data; and
    replacing the current performance level with the calculated new performance level upon an occurrence of a certain condition.

12. The method of claim 11, wherein the certain condition is when an operating time of the SSD at the current performance level is greater than a set time period.

13. The method of claim 12, wherein the set time period is one of a number of hours, a number of days, a number of weeks, and a number of months.

14. The method of claim 12, wherein the set time period is set in response to a period setting command from the host.

15. A method of throttling performance of a semiconductor storage device (SSD) including a non-volatile memory device and a controller to control the non-volatile memory device, the method comprising:
    operating the SSD at a performance level based on a previous workload history thereof;
    receiving commands from a host;
    gathering workload data of a current workload of the SSD based on the commands;
    calculating a new performance level to be applied to the SSD based on the gathered workload data;
    determining a difference between the calculated new performance level and a previous performance level and a reference difference value; and
    adjusting the calculated new performance level to be a value different from the previous performance level by the reference difference value when the determined difference between the calculated new performance level and the previous performance level is greater than the reference difference value and applying the adjusted calculated new performance level, otherwise applying the calculated new performance level.

16. The method of claim 15, wherein the reference difference value is a maximum changeable rate of the performance level of the SSD.

17. The method of claim 15, wherein the reference difference value is a range between certain levels of the performance level of the SSD.

18. The method of claim 10, further comprising:
    calculating a new performance level based on the gathered workload data; and
    selecting a discrete performance level closest to the calculated new performance level to be applied to the SSD when a certain condition occurs.

19. A method of throttling performance of a semiconductor storage device (SSD) including a non-volatile memory device and a controller to control the non-volatile memory device, the method comprising:

operating the SSD at a performance level based on a previous workload history thereof;
receiving commands from a host;
gathering workload data of a current workload of the SSD based on the commands;
calculating a new performance level based on the gathered workload data; and
selecting a discrete performance level closest to the calculated new performance level to be applied to the SSD when a certain condition occurs,
wherein the selecting the discrete performance level closest to the calculated new performance level to be applied to the SSD is performed when a level gap between the selected discrete performance level and the performance level based on the previous workload history is less than or equal to a predetermined reference gap, otherwise selecting the discrete performance level within the predetermined reference gap to be applied to the SSD.

20. The method of claim 11, wherein the previous workload history is an estimated workload history of the SSD.

21. The method of claim 11, wherein the previous workload history is a programmed workload history.

22. A semiconductor storage device (SSD), comprising:
a non-volatile memory device; and
a controller connected to the non-volatile memory device and configured to gather workload data related to a workload of the SSD based on commands received from a host, to make an estimate of a future workload of the SSD based on the workload data, to calculate a new performance level of the SSD according to the estimate of the future workload of the SSD, and to change a performance level of the SSD based on an occurrence of certain conditions,
wherein a change in performance level is achieved by increasing or decreasing an intentionally added delay realized by at least one of controlling a speed of a clock signal applied to an element of the SSD and inserting an idle time between a first operation of the SSD and a second operation of the SSD, each of the first operation and the second operation including one of a read operation and a write operation.

23. The SSD of claim 22, wherein the controller comprises:
a throttling module configured to change the performance level of the SSD by applying the new performance level of the SSD based on the estimate of the future workload of the SSD.

24. The semiconductor storage device (SSD) of claim 22, wherein the controller comprises:
a throttling module configured to change the performance level of the SSD to the new performance level when the new performance level is equal to or greater than a predetermined reference value, otherwise configured to change the performance level to the predetermined reference value.

25. The SSD of claim 24, wherein the predetermined reference value is a minimum performance level.

26. The semiconductor storage device (SSD) of claim 22, wherein the controller comprises:
a throttling module configured to change the performance level of the SSD to the new performance level when the new performance level is less than or equal to a predetermined reference value, otherwise configured to change the performance level of the SSD to the predetermined reference value.

27. The SSD of claim 26, wherein the predetermined reference value is a maximum performance level.

28. The SSD of claim 22, wherein the certain conditions include when the performance level has been performed for a set time period.

29. The SSD of claim 28, wherein the set time period is one of a number of hours, a number of days, a number of weeks, and a number of months.

30. A semiconductor storage device (SSD), comprising:
a non-volatile memory device; and
a controller connected to the non-volatile memory device and configured to receive commands from a host, to control the SSD based on a previous workload history thereof, and to gather workload data of the current workload of the SSD based on the commands in anticipation of calculating a new performance level,
wherein a change in performance level is achieved by increasing or decreasing an intentionally added delay realized by at least one of controlling a speed of a clock signal applied to an element of the SSD and inserting an idle time between a first operation of the SSD and a second operation of the SSD, each of the first operation and the second operation including one of a read operation and a write operation.

31. The SSD of claim 30, wherein the controller comprises:
a host interface I/F to receive the commands from the host; and
a workload module to gather the workload data of the SSD.

32. A semiconductor storage device (SSD), comprising:
a non-volatile memory device;
a controller connected to the non-volatile memory device, having a host interface configured to receive commands from a host, having a workload module configured to gather workload data of the current workload of the SSD based on the commands, the controller configure to control the SSD based on a previous workload history thereof; and
a throttling module to calculate a new performance level to be applied to the SSD based on the workload data, to determine a difference between the new performance level and a previous performance level and a reference difference value, to produce an adjusted new performance level to be a value different from the previous performance value by the reference difference value when the difference between the new performance level and the previous performance level is greater than the reference difference value, and to apply the adjusted new performance level, otherwise to apply the new performance level.

33. The SSD of claim 32, wherein the reference difference value is a maximum changeable rate of performance of the SSD.

34. A semiconductor storage device (SSD), comprising:
a non-volatile memory device;
a controller connected to the non-volatile memory device, having a host interface configured to receive commands from a host, having a workload module configured to gather workload data of the current workload of the SSD based on the commands, the controller configure to control the SSD based on a previous workload history thereof; and
a throttling module to calculate a new performance level based on the workload data and to select a discrete performance level closest to the new performance level to be applied to the SSD when a level gap between the discrete performance level and a performance level based on the previous workload history is less than or equal to a predetermined reference gap, otherwise to select the discrete performance level within the predetermined reference gap to be applied to the SSD.

35. A semiconductor storage device (SSD), comprising:

a non-volatile memory device; and a controller connected to the non-volatile memory device and configured to receive commands from a host, to control the SSD based on a previous workload history thereof, and to gather workload data of the current workload of the SSD based on the commands, wherein the non-volatile memory device is configured to store a throttling program code, and the controller is configured to control the throttling program code to calculate a new performance level to be applied to the SSD based on the workload data, to determine a difference between the new performance level and a previous performance level and a reference difference value, to produce an adjusted new performance level to be a value different from the previous performance value by the reference difference value when the difference between the new performance level and the previous performance level is greater than the reference difference value, and to apply the adjusted new performance level, otherwise configured to apply the new performance level.

36. A semiconductor storage device (SSD), comprising:

a non-volatile memory device; and a controller connected to the non-volatile memory device and configured to receive commands from a host, to control the SSD based on a previous workload history thereof, and to gather workload data of the current workload of the SSD based on the commands, wherein the non-volatile memory device is configured to store a throttling program code, and the controller is configured to control the throttling program code to calculate a new performance level based on the workload data and to select a discrete performance level closest to the new performance level to be applied to the SSD when a level gap between the discrete performance level and a performance level based on the previous workload history is less than or equal to a predetermined reference gap, otherwise configured to select the discrete performance level within the predetermined reference gap to be applied to the SSD.

* * * * *